United States Patent [19]
Hiroaki

[11] Patent Number: 5,786,846
[45] Date of Patent: Jul. 28, 1998

[54] USER INTERFACE OF A VIDEO COMMUNICATION TERMINAL UNIT AND A METHOD FOR NOTIFYING A TERMINAL USER'S DEVIATION FROM AN APPROPRIATE SHOOT RANGE

[75] Inventor: Toshihiko Hiroaki, Tokyo, Japan

[73] Assignee: NEC Corporation, Tokyo, Japan

[21] Appl. No.: 615,031

[22] Filed: Mar. 11, 1996

[30] Foreign Application Priority Data

Mar. 9, 1995 [JP] Japan ................................. 7-049639

[51] Int. Cl.$^6$ ................................................ H04N 7/14
[52] U.S. Cl. ...................................... 348/20; 348/13
[58] Field of Search ............................. 348/12, 13, 14, 348/15, 20; 455/5.1; H04N 7/10, 7/14, 7/173

[56] References Cited

U.S. PATENT DOCUMENTS

| | | | |
|---|---|---|---|
| 3,116,365 | 12/1963 | Prescott | 358/85 |
| 3,495,908 | 2/1970 | Rea | 358/85 |
| 3,532,815 | 10/1970 | Torok | 358/85 |
| 5,430,473 | 7/1995 | Beecher, II et al. | 348/14 |

FOREIGN PATENT DOCUMENTS

| | | | |
|---|---|---|---|
| 3295382 | 12/1991 | Japan | H04N 7/14 |
| 4239284 | 8/1992 | Japan | H04N 7/14 |

OTHER PUBLICATIONS

C. Cool et al, "Iterative Design of Video Communication Systems", *CSCW 92 Proceedings*, Nov. 1992, pp. 25–32.

Scott H. Early et al, "The VideoPhone 2500—Video Telephony on the Public Switched Telephone Network", *AT & T Technical Journal*, Jan./Feb. 1993, pp. 22–32.

Nicholas I. Benimoff et al, "Multimedia User Interfaces for Telecommunications Products and Services", *AT & T Technical Journal*, May/Jun. 1993, pp. 42–49.

Joel S. Angiolillo et al, "Video Telephony", *AT & T Technical Journal*, May/Jun. 1993, pp. 7–20.

Bill Buxton et al, "Europarc's Integrated Interactive Intermedia Facility (IIIF): Early Experiences", *Multi–User INterfaces and Applications*, 1990, pp. 11–34.

*Primary Examiner*—Mark R. Powell
*Assistant Examiner*—John W. Miller
*Attorney, Agent, or Firm*—Sughrue, Mion, Zinn, Macpeak & Seas, PLLC

[57] ABSTRACT

A local user's location detection section 101 detects local user's location, generates location information 104 and sends the location information 104 to a local user's location discrimination section 102. The local user's location discrimination section 102 stores information on a shoot range of a camera section, judges whether the local user is in the shoot range of a camera section 602, generates notification control information 105 and sends the notification control information 105 to a notification section 103. According to the notification control information 105, the notification section 103 generates an video image 291 for notifying the local user itself whether the local user is in the shoot range of the camera section or out of the shoot range of the camera section, and sends the video image to a display section 603. If the local user is in the shoot range of the camera section, the remote user's video image 290 is sent to the display section as it is.

40 Claims, 13 Drawing Sheets

In case a local user is in the shoot range of a camera.

In case a local user is out of the shoot range of a camera.

In case a local user is out of the shoot range of a camera.

In case a local user is out of the shoot range of a camera.

In case a local user is in the shoot range of a camera.

In case a local user is out of the shoot range of a camera.

In case a local user is in the shoot range of a camera.

In case a local user is out of the shoot range of a camera.

In case a local user is in the shoot range of a camera.

In case a local user is out of the shoot range of a camera.

The user is too close to left. Move to right a bit.

In case a local user is in the shoot range of a camera.

In case a local user is out of the shoot range of a camera.

USER INTERFACE OF A VIDEO COMMUNICATION TERMINAL UNIT AND A METHOD FOR NOTIFYING A TERMINAL USER'S DEVIATION FROM AN APPROPRIATE SHOOT RANGE

BACKGROUND OF THE INVENTION

This invention relates to a user interface of a video communication terminal unit and, more particularly, to the one which allows a video local user to operate the terminal unit at an appropriate position within the shoot range of the camera, resulting in smooth and natural communication with the remote user.

Generally video phone, teleconferencing system and real time conferencing system via groupware have been used as the terminal unit by which a video local user communicates with the other remote user via a monitor screen displaying the respective video images sent or received between them. With the above-described unit, the local user sees some video image filmed at his/her site or the mirror image displayed on the local user's terminal screen. By this the local user confirms that he/she locates at an appropriate position in the shoot range of the camera. More specifically the system is designed to notify the local user of the change in his/her location by switching the video image filmed at the local user site to that of the remote local user on the terminal screen. Alternatively a small window showing the video image filmed by the local user site is displayed on the screen together with the remote user's video as FIG. 15A shows (picture in picture system) and the local user's video is displayed as a quadrant section of the screen where the remote user's video has been shown as in FIG. 15B. Furthermore, apart from the display unit for showing the remote user's video, an extra display unit is prepared for displaying the local user's video. The video communication terminal unit controlled by the computer has a plurality of small windows showing video images displayed concurrently. So this terminal unit is designed to display the small window of the local user's video image as well as that of the remote user as FIG. 15C shows.

FIG. 16 shows a construction of the prior art video communication terminal unit for displaying the local user's video image. A local user's video 690 filmed by a camera 602 is distributed into two signals in a video signal distribution section 1601, a signal sent to the remote user via a communication processing section 601 and a signal sent to a display screen processing section 1602 which will be displayed on a display 603 at the local user site. A video communication section transmits the local user's video to the remote user in a remote place and receives the video signal sent from the remote user. The received remote user's video image 290 is sent to the display screen processing section 1602, through which the remote user's video image 290 is further sent to the display in a normal condition. In case the local user orders to display his/her own video image on the screen through a display operation command input means 1603 (switch, keyboard or mouse), the display screen processing section 1602 transmits the local user's video to the display or synthesizes the local user's video with the remote user's video. As a result, the local user can see his/her own video image on the display.

With the conventional terminal unit, when the local user deviates from the shoot range of the camera, the shoot range is generally adjusted by moving the set location or optical axis of the camera, adding zoom function to the camera and adjusting the position of the power driven universal head on which the camera enclosure is placed. Alternatively a plurality of cameras are prepared, each of which is set to have different shoot range. The shoot range can be controlled by selecting the suitable one among them.

Japanese Patent Application Laid Open No. 239284/1992 titled "Video phone system" has disclosed the technique which allows the local user to communicate with the remote user within the shoot range of the camera without operating the camera. In Japanese Patent Application Laid Open No. 295382/1991 titled "Video phone system of user tracking type", the camera is designed to track every movement of the local user by detecting his/her current location for changing the shoot range.

Displaying the video image other than that of the remote user during communication may prevent both users from concentrating on their conversation and distract their attentions from communication. Displaying the call user's video on the terminal at the local user site gives a certain kind of strain to the local user who may become conscious of the camera and being filmed. As a result, the local user is likely to avoid the strain by moving out of the shoot range.

The procedure for changing shoot range of the camera at either site is troublesome, which diverts their attentions to other things irrelevant to the conversation. Accordingly they no longer continue spontaneous communication like face to face conversation. The local user becomes conscious of the camera by operating it. Furthermore frequently varied shoot range may confuse the local user as to which part the camera is filming at present. Therefore, the video filmed by the camera at the local user site should be displayed so that the local user confirms his/her current shoot range. In case the shoot range is variable and the remote user is allowed to control the shoot range of the camera at the local user site, the privacy of the local user may be invaded. It is necessary to settle the problem accompanied with controlling the camera by defining to what extent the remote user is allowed to manipulate the local user's camera, how to assign the right to operate the camera to the respective users and coordinating the contention between camera operations at both users.

The technique for automatically changing the shoot range of the camera through tracking the location of the local user has been disclosed in Patent Application Laid Open Nos. 239284/1992 and 295382/1991. In the environment resulted from the above technique, the shoot range is changed without any intended action of the local user, resulting in changing the screen view seen by the local user. The above environment causes the viewer looking at the screen to lose his/her sense of direction and feel uncomfortable. In the extreme case that the local user frequently moves around, jumping up and down or shaking during shooting, the resultant video image becomes so shaky that the viewer may feel sickness or dizziness. In such a situation that the camera is always tracking the movement of the local user, he/she inevitably gets conscious of the camera and feels a certain strain. In order to eliminate phycological strain of the local user, it should be arranged to make the local user change the shoot range out of his/her intension.

The normal face to face conversation will be conducted between two parties by facing with each other. Most of the people accept this type of conversation, i.e., they are always looking with each other, as natural one. In case of the conversation through the conventional video communication terminal unit, the local user cannot see the remote user, but the local user's video is seen by the remote user. Although the local user tries to face and talk to the remote user, his/her video may not be seen by the remote user. The local user will be kept unknown about the fact until bing notified. Or the local user may have a feeling that he/she is always monitored by the other party. This type of conversation reveals inferiority to the normal face to face conversation, failing to transfer non-verbal information which effectively improves the conversation between two users. In the environment where no face to face conversation is realized, i.e., the local user cannot confirm whether the remote user is seeing the terminal display or how the displayed local user's video looks like, the video image seen by the local user does not always correspond with that seen by the remote user. Accordingly they tend to lose interests in the communication. In order to have the local user notified as to what part of his/her video is seen by the remote user, it is necessary to display the video filmed at the local user site on his/her terminal screen.

SUMMARY OF THE INVENTION

It is an object of the present invention to provide a terminal user interface for realizing spontaneous face to face conversation by sending and receiving video without requiring to display the video image at the local user site and to change the shoot range of the camera during conversation as well as keeping both users from having uncomfortable feeling.

The object of the present invention is achieved by a user interface of a video communication terminal unit having a shoot means for shooting a terminal user, a display means for displaying a video image and a video communication processing means for executing video communication between the terminal user and a remote terminal user, the user interface comprising:

- a location detection means for detecting a location of the terminal user shot by the shoot means and generating information on the terminal user's location;
- a location judgement means for determining whether or not the terminal user is within an appropriate shoot range of the shoot means and generating notification control information based on the determination result; and
- a notification means for notifying the terminal user of his/her deviation from the shoot range if the notification control information indicates the terminal user's deviation.

With the user interface of a video communication terminal unit of the present invention, the location detection section detects the current location of the local user and generates the location information, which is sent to the location discrimination section. The location discrimination section storing the information on shoot range of the camera judges whether or not the local user is within the shoot range and generates the notification control information as the judgement result, which is sent to the notification section. Based on the notification control information, the notification section notifies the local user that he/she is within the shoot range or not. As an example of notification, the information indicating the deviation is shown to the local user who has been judged to deviate from the shoot range. When the local user comes back into the shoot range, the display resumes the normal status by removing the deviation information.

In addition, based on the notification control information indicating that the local user is within the shoot range, the received video processing section sends the remote user's video image received in the video communication section to the display section as the video signal without giving any processing thereto. If the notification control information indicates the local user's deviation, the received video processing section processes the received remote user's video image so as to represent the local user's deviation and then sends the processed video signal to the display section.

Moreover, the notification video producing section produces the video image representing the local user's deviation from the shoot range, which is sent to the video synthesizing selection section as the notification video image. Based on the notification control information indicating that the local user is within the shoot range, the video synthesizing selection section sends the remote user's video image received in the video communication section to the display section as the video signal without giving any processing thereto. When the notification control information indicates the local user's deviation, the video synthesizing selection section sends the notification video image to the display section as the video signal. Alternatively the video synthesizing selection section synthesizes the remote user's video image and notification video image into the video signal which is sent to the display section Furthermore, the local user's location discrimination section sends the notification control information to the video synthesizing selection section and the received video processing section. The notification video producing section produces the video image indicating the local user's deviation from the shoot range of the camera, which is sent to the video synthesizing selection section. Based on the notification control information indicating that the local user is within the shoot range, the received video processing section sends the remote user's video image received in the video communication section to the video synthesizing selection section as the video signal without giving any processing thereto. When the notification control information indicates the local user's deviation, the received video processing section processes the received remote user's video so as to represent the local user's deviation and sends the processed video signal to the video synthesizing selection section. Based on the notification control information indicating that the local user is within the shoot range, the video synthesizing selection section sends the video signal to the display section without giving any processing thereto. When the notification control information indicates the local user's deviation, the video synthesizing selection section sends the notification video to the display section as the video signal, or synthesizes the video signal and the notification video image into the video signal which is sent to the display section.

Furthermore, based on the notification control information indicating the local user's deviation, the notification information production section produces the notification information representing his/her deviation which is sent to the notification information output section. The notification information output section outputs the notification information to the local user.

Moreover, the location discrimination section sends the notification control information to the notification information production section and either the received video processing section or the video synthesizing selection section. Based on the notification control information indicating the local user's deviation from the shoot range, the notification information production section and either the received video processing section or the video synthesizing selection section notify the local user that he/she deviates from the shoot range of the camera.

In case the local user deviates from the shoot range of the camera, also notify to the local user with output sounds.

In addition, in case the local user deviates from the shoot range of the camera, shoot range of the remote user's video image displayed on the screen is changed or position of the remote user's video image displayed on the screen is changed.

Moreover, in case the local user deviates from the shoot range of the camera, the size of the remote user's video image displayed on the screen is changed.

Furthermore, in case the local user deviates from the shoot range of the camera, characteristics relating to brightness of the remote user's video image displayed on the screen are changed.

Moreover, in case the local user deviates from the shoot range of the camera, characteristics relating to color hue of the remote user's video image displayed on the screen are changed.

Furthermore, in case the local user deviates from the shoot range of the camera, the window frame for showing the remote user's video image displayed on the screen is changed.

Moreover, in case the local user deviates from the shoot range of the camera, information on the deviation amount, deviation direction or message guiding to resume the original location is displayed on the screen.

Moreover, in case the local user deviates from the shoot range of the camera, the display of the remote user's video image is switched to the non-display condition.

Moreover, in case the local user deviates from the shoot range of the camera, the remote user's video image is changed stepwise between display and non-display conditions in response to the deviation amount.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
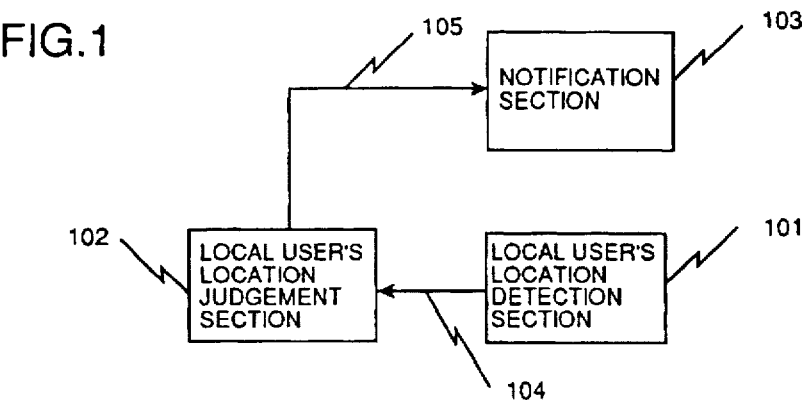
FIG. 1 is a block diagram of a construction of the user interface of a video communication terminal unit of the first embodiment.

In the description of the present invention, "local user" refers to the party who uses the terminal unit and tries to communicates with the other remote user referred to as a "remote user". The video images sent/received between two users are assumed to be motion or semi-motion pictures. Sending/receiving still pictures may provide the whole or some part of intended effects. The present invention transfers both video images and information as a combination of the video image and sounds. It can transfer other type of information to which the additional effect has been added to the video image and sounds.

In order to realize the environment where remotely located two parties communicate like face to face conversation by sending and receiving video images (video communication environment), the terminal user interface is required. With this terminal user interface, the video image of the local user site does not have to displayed and the shoot range of the camera does not have to changed during communication unless the local user intends to do so. The user interface of the present invention allows both users to have natural communication like face to face conversation in the video communication environment which eliminates the necessity of displaying the video image at the local user site or changing the shoot range of the camera during conversation.

An embodiment of the present invention is described referring to the drawings.

FIG. 1 is a construction example of a first embodiment of the user interface of the video communication terminal unit.

A local user's location detection section 101 detects the position of the local user and generates location information 104 which is sent to a local user's location discrimination section 102. The local user's location discrimination section 102 storing information on the shoot range of the camera judges whether the local user is within the shoot range and generate the judgement result as notification control information 105, which is sent to a notification section 103. Based on the notification control information 105, the notification section 103 notifies the local user whether or not he/she is within the shoot range. When the local user deviates from the shoot range, information indicating the deviation is displayed on the screen at the local user site. When the local user comes back into the shoot range, the information is erased for returning to the normal condition.

The local user's location detection section 101 is further described. The local user's location detection section 101 outputs location information 104 by detecting the presence of the local user or measuring his/her location. The location information 104 is represented by absolute coordinated values with the specific space coordinate defined as a zero point (reference point) or locational correlation or relative coordinate values (by incrementing or decrementing the absolute coordinated values) between the terminal unit/camera and the local user. The above information is transferred in the form of numerical value, text and varied amount of physical quantity such as electric signals, electromagnetic wave (light) and acoustic wave. The local user's location detection section has a built-in location detection means such as the location sensor. The location detection means measures the locational correlation between the local user and the terminal unit/camera in real time (at time interval or time-delay providing the same effects) by means of magnetic sensor, ultrasonic sensor, pressure sensor, acceleration sensor, infrared ray sensor or providing arithmetic processing to the input video image of the camera. It is preferable to employ the location detection means of the non-contact type which does not require the local user to carry or touch, by which convenience or comfort of communication is improved.

The local user's location discrimination section 102 is further described.

The local user's location discrimination section 102 stores information referenced to judge whether the local user is within the shoot range of the camera based on the location information 104. For example, the shoot range is expressed by coordinate value range (−1<x<1:x:coordinate value), which is compared with numerical value of the location information sent from the local user's location detection section for judging the presence/absence of the local user in the shoot range. In case the location information is expressed by the displacement of the electric signal, the shoot range may be defined by threshold value or range of the physical quantity of the signal (for example, 0.5V or higher, or 0.5V to 0.8V).

Description on the locational coordinate system for the local user's location detection section on the local user's location discrimination section is described. Both sections can share the same coordinate system. Alternatively it is possible that each section has a different coordinate system, either of which can be switched in order to judge whether or not the local user is present within the shoot range of the camera. As far as such judgement can be correctly conducted, any type of coordinate system (rectangular or polar coordinates) can be selected or coordinate origin can be positioned to the desired point of the real space. However, it is efficient to set the coordinate origin to the video communication terminal unit, camera or the local user's location detection section in view of simplifying procedures.

In case the location coordinate value in the shoot range of the camera dynamically varies, the coordinate system of the local user's location detection section or local user's location discrimination section will be varied interactively to the orientation of optical axis or movement of the camera. In the above case, the local user's location detection section detects and outputs a relative locational correlation between the camera and the local user. Alternatively the coordinate system for the local user's location detection section or the local user's location discrimination section is fixed and the information on the shoot range stored in the local user's location discrimination section is updated. In the former method, for example, the local user's location section is fixed to the camera. With the above method, the coordinate system of the local user's location detection section is automatically changed interactively to the operation of the camera. As a result, the local user's location detection section can always detect the locational correlation between the local user and the camera. This method further allows for correct judgement of the local user's location in spite of fixed information on the shoot rage of the camera which has been stored in the local user's location discrimination section. As the latter method, the local user's location discrimination section dynamically detects the shoot range. Based on the result, it corrects or varies the value (coordinate value indicating the shoot range of the camera) required for location judgement. The shoot range of the camera varies through controlling the operation of the camera or the terminal unit including the camera. By applying the present invention, for example, setting, measuring or calibrating the coordinate values for the shoot range at every power supply to the terminal unit, subsequent camera operation is not required. In case the shoot range can be fixed, all the required procedure is to set the shoot range at a time of setting the terminal unit. The camera shoot range can be changed while using the terminal unit by setting or measuring the coordinates value thereof.

In case both users communicate with each other interactively, shoot range, shoot direction or lens characteristics (focal distance) of the camera are so set that the local user can be appropriately filmed by the camera at the required position to make his/her video facing to the remote user. It is efficient to select the optical system (display screen and camera) which allows for interactive communication in order to realize the environment for natural face to face conversation.

The local user's location discrimination section 102 judges whether or not he/she is present in the shoot range of the camera. It further outputs the judgement result at binary mode, for example, "present/absent", or as a consecutive value of deviation amount indicating how far the local user has deviated from the shoot range. The video of the local user shows the deviation from the shoot range step by step consecutively and partially (the local user's face has deviated and then other parts of the body). In case of outputting the judgement result at a binary (2 values) mode, it is necessary to define exact deviation range. In case of outputting the judgement result as the consecutive value, it is necessary to obtain the numerical value as the deviation amount by calculating the distance between a representative point of the local user's video (center of the head) and that of the shoot range (center of gravity of the polyhedron simulated to the shoot range) or the distance between boundaries of the shoot range. It is also applicable to obtain the consecutive value as the area ratio of the local user's image to the shoot range of the camera.

The judgement result of the local user's location discrimination section 102 is output as the notification control information 105. The output form as either binary value or consecutive numerical value depends upon characteristics of the notification section. If the notification section cannot output an intermediate value between two values (ON and OFF), the judgement result is output at the binary mode. In case the local user's location detection section outputs binary values, it is preferable to form the detected results into binary values. In case information for notification varies consecutively, it is preferable to output the notification control information as the consecutive value.

The notification control information contains a command for controlling the equipment in the notification section as well as judgement results. The information itself is transmitted in the form of sequence of characters and code as numerical values or varied amount of physical quantity as a contact signal, voltage, current, electromagnetic wave and acoustic wave. If the notification section is provided with a plurality of processing sections and information outputting equipment, the command system is designed to operate them selectively by, for example, attaching header (ID) to the command.

The location information and notification control information can be radio transmitted so as to locate the notification section, local user's location discrimination section and local user's location detection section to desired positions. This allows the user to carry the user's location detection section or notification section by separating from the terminal unit. When setting a plurality of local user's location detection sections and notification sections in the room, wiring in the room or around the terminal are not necessary. As a result, they can be set efficiently to the great extent of freedom.

The notification section 103 notifies the local user filmed by the camera that he/she deviates from the shoot range of the camera. Upon being notified, the local user recognizes that he/she is out of the shoot range of the camera through, for example, displaying or erasing the information on the display unit such as CRT or LCD. Alternatively the illuminant such as lamp and light emitting diode is illuminated or flashed, a certain substance is set to be interactive to the actuating device such as a motor, acoustic wave is output, dynamical action is given such as transmitting vibration, pressure and physical contact, electrical stimulation is given to the body, especially to the skin and gas is released to emit a certain kind of smell. Preferably the user interface for realizing comfortable terminal usage helps the local user realize his/her deviation from the shoot range intuitively and easily without accompanying complicated procedures and discomfort in use.

In what way or how the local user is notified his/her deviation is described. The user interface of the present invention provides a communication dialogue environment which allows the local user to realize his/her deviation from the shoot range intuitively and easily without accompanying complicated procedures and discomfort in use. The notification to the local user is realized by means of the respective methods A, B and C or combination thereof.

In the method A, the remote user's video is displayed when the local user is within the shoot range of the camera. While if the local user deviates from the shoot range, the video image of the remote user is changed. The local user confirms his/her location by seeing the remote user's video displayed on the screen.

In the method B, the video other than that of the remote user is displayed when the local user deviates from the shoot range. Different picture or image can be overlaid with the remote user's video, or either a picture and message (character, CG, image information) is displayed in the area other than that for the remote user's video.

In the method C, different means independent of the display showing the remote user's video is used to notify the local user of the deviation. More specifically this method uses sounds, illumination of the indicator lamp, message (character, CG, image information) shown on the other display means or dynamical means giving vibration or contact to the local user.

Combining the respective methods provides various kinds of notification mode to the great degree of freedom.

Next, second embodiment is described referring to the drawings.

Figure 2:
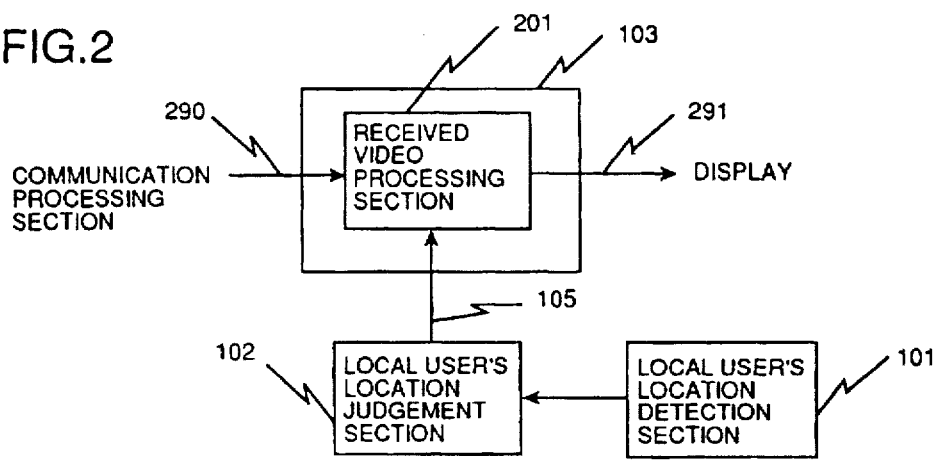
FIG. 2 is a block diagram of a construction of the user interface of a video communication terminal unit of the second embodiment.

FIG. 2 shows a construction example of the user interface of the video communication terminal unit according to the second embodiment. If the local user is within the shoot range, responding to the notification control information 105, a received video processing section 201 sends a remote user's video image 290 which has been received by the video communication section to a display section as a video signal 291 without processing. If the local user deviates from the shoot range, the received video processing section 201 processes the remote user's video so as to notify the local user of his/her deviation. The processed video signal 291 is sent to the display section.

The video processing to indicate the local user's deviation is described. It is necessary to process the video so that the resultant display is distinguished from the normal display on which the remote user's video has been shown. It can be done by: changing scrolling or display position of the remote user's video; cutting display part; changing brightness or hue of color,; enlarging/reducing the video size; deforming the video; numerically processing the video such as differentiation or integration; displaying still picture; displaying frame feed or frame at slow speed; adding special effects such as mosaic or wipe; reversing the video horizontally and vertically; rotating the video; dividing the display and synthesizing chromakey. It is efficient to select the method which allows the local user to notify the deviation from the shoot range intuitively. For example, the value or degree of the processing is changed based on the local user's location.

Then, third embodiment is described referring to the drawings.

Figure 3:
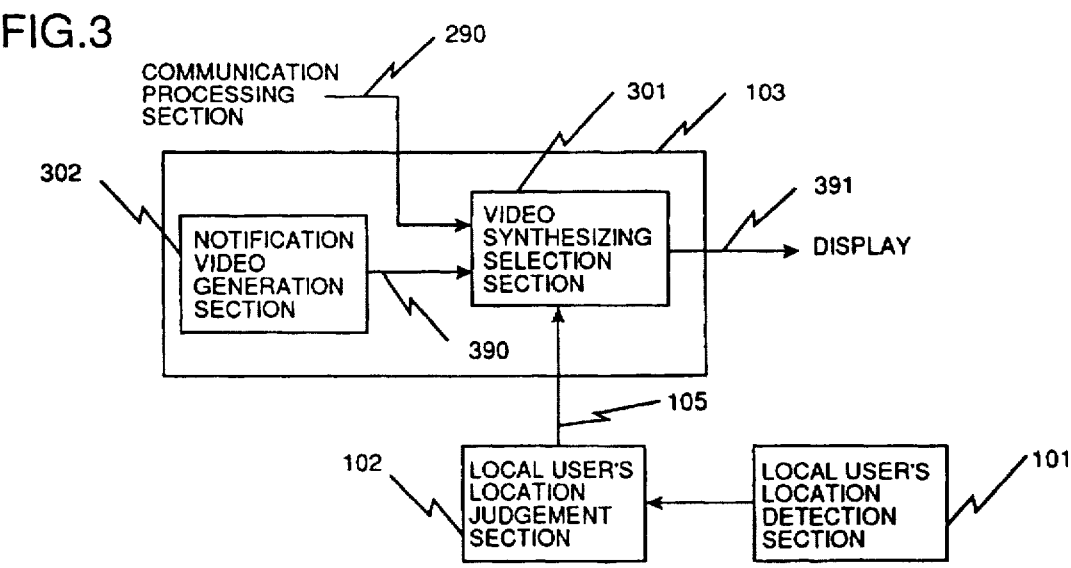
FIG. 3 is a block diagram of a construction of the user interface of a video communication terminal unit of the third embodiment.

FIG. 3 shows a construction example of the user interface of the video communication terminal unit of the third embodiment. A notification video generation section 302 generates the video indicating that the local user is out of the shoot range and sends the generated notification video 390 to a video synthesis selection section 301. If the local user is within the shoot range of the camera, responding to the notification control information 105, the video synthesis selection section 301 sends the remote user's video image 290 as it is which has been received by the video communication section to the display section in the form of a video signal 391. If the local user is out of the shoot range, the video synthesizing selection section 301 sends the notification video 390 to the display section as the video signal 391. Alternatively the video synthesizing selection section 301 synthesizes the remote user's picture 290 and the notification video 390 into the video signal 391, which is sent to the display section.

Hereinafter, the notification video 390 is described.

The notification video can be displayed by switching off the remote user's video or by overlaying or superimposing the remote user's video. The notification video 390 uses the video image other than that of the remote user which has been sent therefrom. As the notification video, it is preferable to use the video image which allows the local user to realize his/her deviation intuitively. For example, it can be done by displaying texts for alarming the user about deviation like "YOU ARE NOT FILMED BY THE CAMERA," or "YOU ARE NOT SEEN BY THE PARTY YOU ARE TALKING TO.", codes or symbols for alarming such as arrow or the like and illustrations or picture indicating the deviation. Displaying the video image something irrelevant to the content of the conversation, landscape of different place is also effective. Supposing that the object of the present invention is limited to notify the local user of his/her deviation from the shoot range, it is possible to use the video image filmed by the local user site as the notification video.

The video signals 291 and 391 of the second and third embodiments and display video image are described.

The video image sent to the display section in the second and third embodiments is fully occupied with the remote user's video or the processed video. Or the video image is partially displayed as a small window on the display screen. The former case is for displaying only the remote user's picture. The latter, the remote user's video is overlaid with the background image or the remote user's video is contracted and partially displayed on the screen. The background image for window display is generated by the received video processing section and display section of the second and the third embodiments, respectively. Synthesizing the background image and remote user's picture is conducted by the received video processing section which has generated the background image. Synthesizing the background image and remote user's video and displaying the synthesized video image are conducted by the display section which has generated the background image. In the third embodiment, the background image can be generated by the notification video generation section in addition to the display section as described in the second embodiment. In case of generating the background image by the notification video generation section, synthesizing will be conducted by the video selection synthesizing section.

Figure 4:
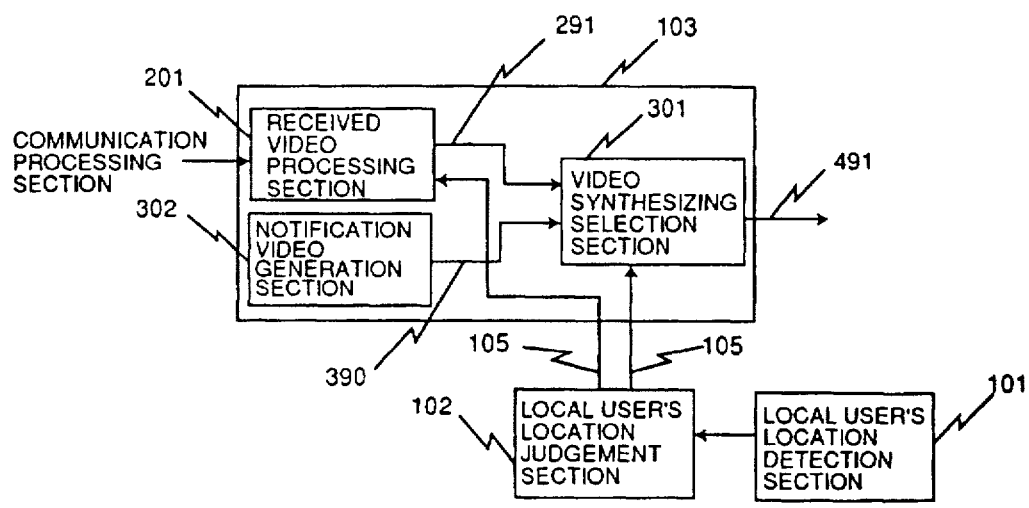
FIG. 4 is a block diagram of a construction of the user interface of a video communication terminal unit of the fourth embodiment.

An embodiment of the fourth is described referring to FIG. 4.

FIG. 4 shows a construction example of the user interface of the video communication terminal unit of the fourth embodiment. A local user's location discrimination section 102 sends the notification control information 105 to both the video synthesizing selection section 301 and the received video processing section 201. The notification video generation section 302 generates the video image indicating that the local user is out of the shoot range of the camera and sends the resultant notification video 390 to the video synthesizing selection section. Responding to the received notification control information 105, if the local user is within the shoot range, the received video processing section 201 sends the received remote user's video to the video synthesizing selection section 301 as the video signal without processing. If the user is out of the shoot range, the remote user's video is processed into the video image indicating the deviation of the local user and then the resultant video signal 291 is sent to the video synthesizing selection section 301. Based on the notification control information 105, if the user is within the shoot range, the video synthesizing selection section 301 sends the video signal 291 without processing to the display section as the video signal 391. If the user is out of the shoot range, the notification video 390 is sent to the display section as the video signal 491. Alternatively the video signal 291 is synthesized with the notification video 390 into the video signal 491 which is sent to the display section.

In the embodiment of FIG. 4, the local user's location discrimination section sends the notification control information 105 to both the received video processing section and video synthesizing selection section. Adding the command to control the received video image processing section and the video synthesizing selection section independently or the command functioning to control both sections exclusively to the notification control information may allow both sections or either section to function for notification to the local user. As a result, the range of notification mode for the local user will be broadened including the mode for processing the remote user's video, selecting the notification video image, synthesizing both video images and the like. By adding the function to the local user's location discrimination section for sending the notification control information either to the video synthesizing selection section or the received video processing section, the selection range of the notification mode will be expanded to the great degree of freedom.

The video image is selected by, for example, displaying the notification video image immediately after erasing the remote user's video; displaying the notification video image step by step by controlling display areas of the remote user's video and the notification video (wipe method); and displaying the notification video image through synthesizing two video signals by controlling both ratios thereof (overlap selection method).

Figure 5:
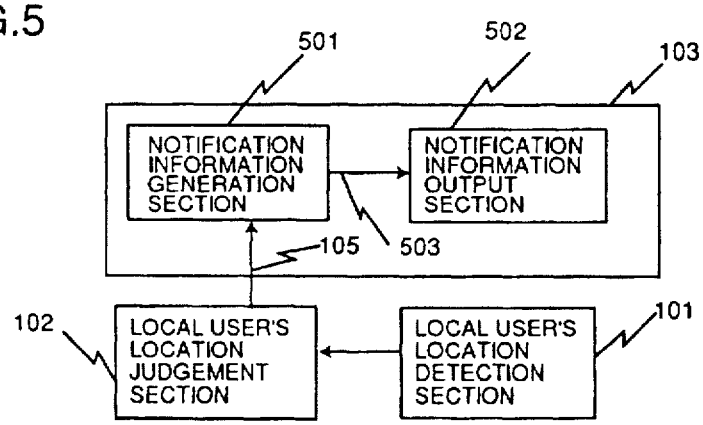
FIG. 5 is a block diagram of a construction of the user interface of a video communication terminal unit of the 5th embodiment.

An embodiment of the fifth is described referring to FIG. 5.

FIG. 5 shows a construction example of the user interface of the video communication terminal unit of the fifth embodiment. Based on the notification control information 105, a notification information generation section 501 generates notification information 503 indicating that the local user filmed by the camera is out of the shoot range, which is sent to the notification information output section 502. The notification information output section 502 outputs the notification information 503 to the local user.

The notification information generation section 501 and notification information output section 502 are described. The notification information generation section 501 analyzes the notification control information 105 and generates information which is supplied to the local user. The notification information generation section 501 sends the notification information 503 to the notification information output section 502 as an electric signal or a photo electromagnetic wave signal. The notification information output section 502 is an equipment for converting the notification information into the physical quantity perceived by the local user. The signal type of the notification signal output by the notification information generation section 501 depends upon the input characteristics of the notification information output section 502. For example, if the notification information output section 502 is formed as the display section, a video signal is generated. In case of being formed as the audio output device including amplifier and speaker units, an audio signal is generated. In case of being formed as the illuminant such as the light emission diode and the bulb or the equipment actuated by current continuity such as buzzer, relay and motor, current or contact signal for actuation is generated. In case of being formed as the equipment for displaying characters, numerals and codes, the electrically coded information is generated. In case of being driven by the coded control command, the control command is generated. The generated signals are sent to the notification information output section 502. Operation of the notification information output section 502 shows the video image, character, sound or gives dynamic action such as vibration or contact to the local user.

It is efficient to provide a plurality of notification information output sections. In such a case, those sections may be the same type, or each section has a different function for outputting different type of information. In case of providing a plurality of notification information output sections of the same type which are set apart, the range by which the user perceives notifications may be broadened. In case of operating a plurality of sections of different type, shortcoming of each section can be compensated with one another. Combining video image and sound, video image and the buzzer vibration and video image, sound and vibration of the vibrator carried by the local user for alarming may allow the local users who may not look at the video image or have disabilities in acoustic or visual sense to perceive the notification efficiently. A plurality of notification information output sections can be controlled by the built-in output selection means provided in the notification information generation section so that the notification information is sent to each section independently.

The difference between the fifth embodiment and the second, third and fourth embodiments is described.

Figure 6:
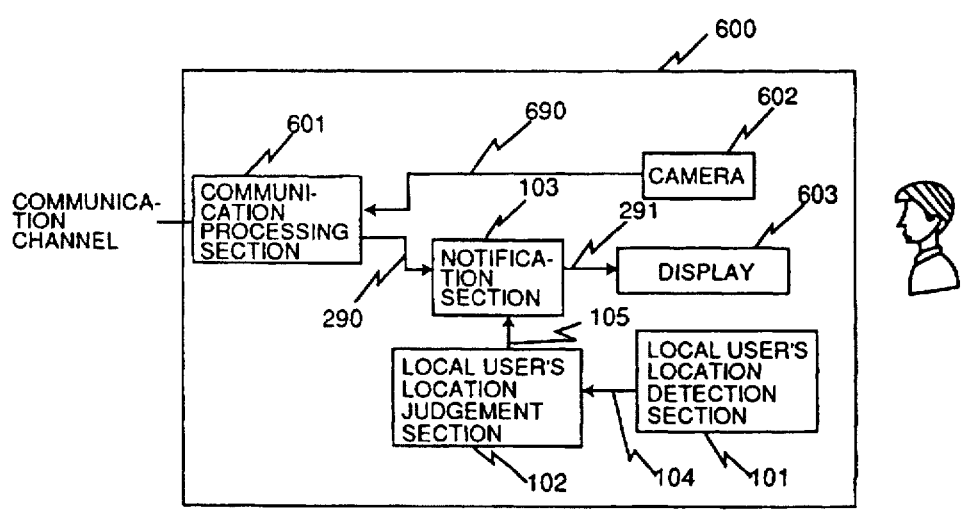
FIG. 6 is a block diagram representing a construction of the video communication terminal unit employed in the second, third and fourth embodiments.
Figure 7:
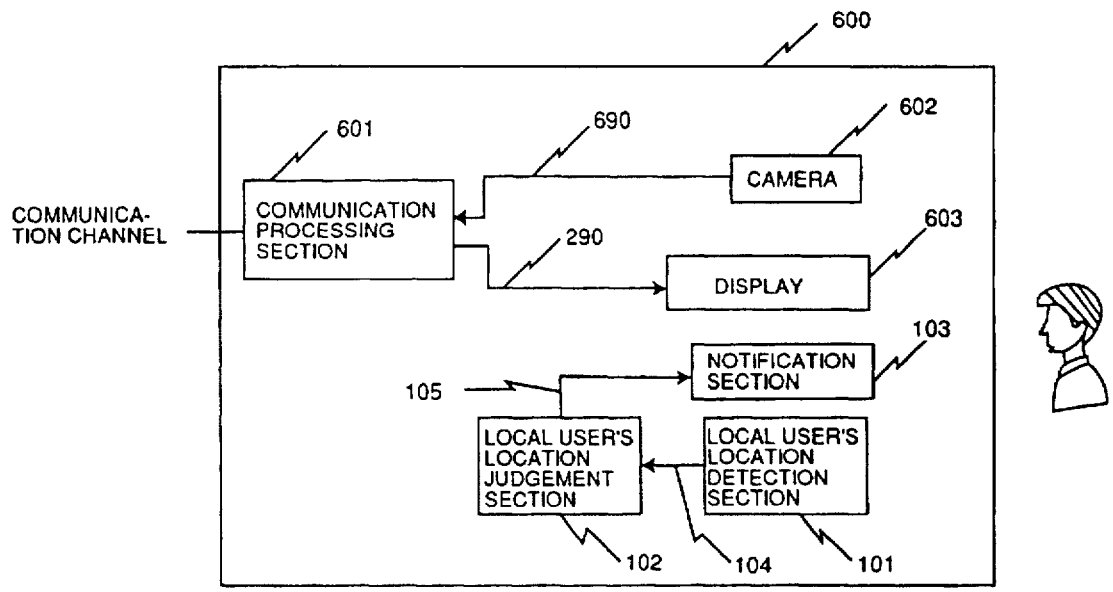
FIG. 7 is a block diagram representing a construction of the video communication terminal unit employed in the fifth embodiment.

FIG. 6 shows an example of the video terminal unit to which the second, third and fourth inventions have been applied. The above example notifies the local user by changing the display of the transmitted remote user's video image 290 or the display around the remote user's video image 290 (in case of windows display, background or window frame of the remote user's video is changed.). In the fifth embodiment, the notification section is set apart from the display section as shown in FIG. 7. So the user is notified by the notification section independent of the display section showing the remote user's video.

An embodiment of the sixth is described referring to the drawing.

Figure 8:
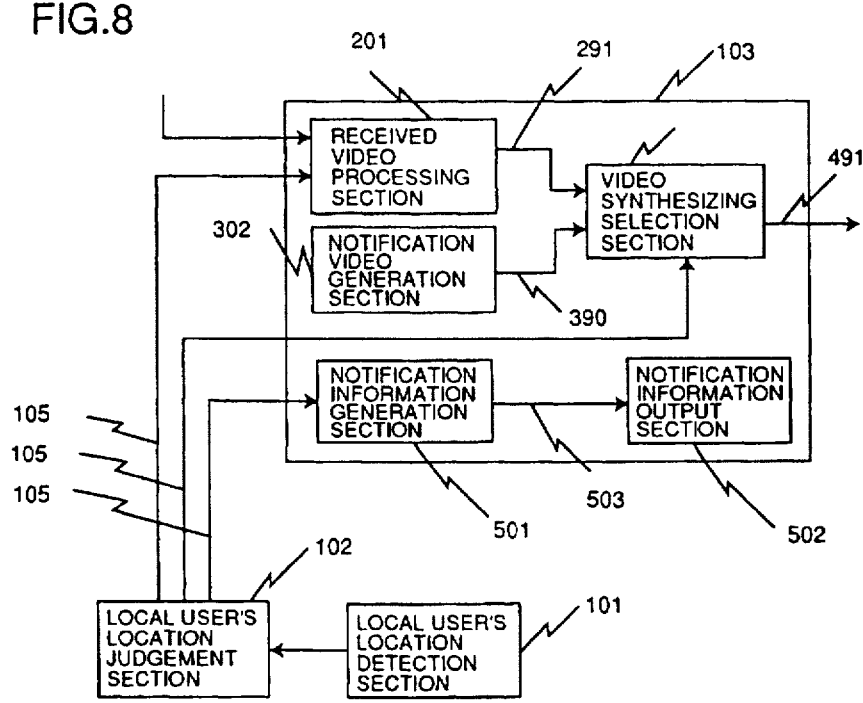
FIG. 8 is a block diagram representing a construction of a user interface of the video communication terminal unit employed in the the sixth embodiment.

FIG. 8 shows a construction example of the user interface of the video communication terminal unit of the sixth embodiment. The local user's location discrimination section 102 sends the notification control information 105 to the notification information generation section 501 and the received video processing section 201 or the video synthesizing selection section 301. Based on the received notification information generation section 501, these sections notify the local user filmed by the camera that of he/she deviates from the shoot range. The sixth embodiment enables the local user to selectively use the notification means through changing the display of remote user's video or other means independent thereof, resulting in wide variety of notification means. The notification by combining the video image of the remote user and sound realizes well balanced notification mode in view of visual and acoustic senses. By this, the local user will perceive his/her deviation from the shoot range even if he/she does not see the display.

In the seventh embodiment, the notification information output section according to the fifth and sixth embodiments outputs sounds to the local user.

An embodiment of the eighth is described referring to the drawing.

FIG. 9 shows examples of the screen where the display area or display position of the remote user's video is changed for notifying the local user of deviation from the shoot range. FIG. 9A shows a display screen 901 where a remote user's video 900 is displayed as a small window 902. In this condition, the local user is assumed to be within the shoot range. The small window 902 shows the video image of the remote user as a whole or partially. The display screens other than shown in FIG. 9A indicate that the local user deviates from the shoot range of the camera. The display mode allowing the local user to face the remote user in front way is hereinafter called as "proper display" or "normal display". The display mode other than FIG. 9A is available if it allows the local user to perceive that he/she resumes normal position within the shoot range. FIG. 9B shows the remote user's video scrolling within the small window 902 when the local user deviates from the shoot range. A section 903 of the window 902 stands for the area which has not been displayed or different from that for the remote user's video. FIG. 9C shows the display screen 901 where the remote user's video 900 is only partially shown due to change in the display starting position. The blank section 904 of the window 902 stands for the area which has not been displayed or different form that for the remote user's video. FIG. 9D shows the display screen 901 where a cut portion of the remote user's video is shown when the local user deviates from the shoot range. If the small windows 902 of FIGS. 9A, 9B and 9C have the same size as that of the display screen 901, the same effect is obtained.

Figure 10:
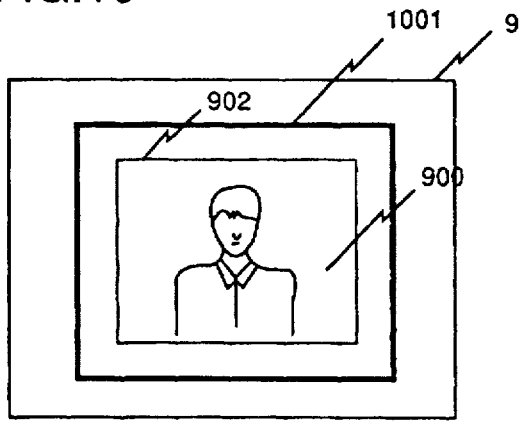
FIG. 10 shows another display screen of the user interface of the video communication terminal unit of the eighth embodiment.
Figure 10:
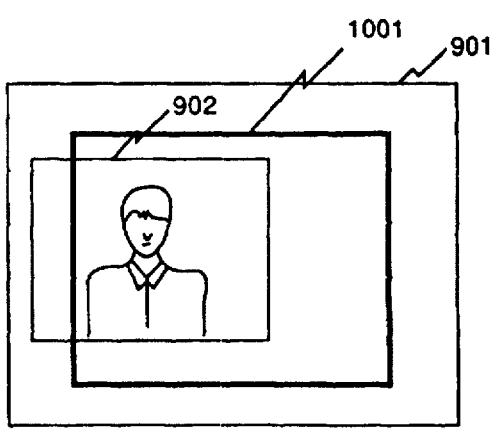

FIG. 10 shows another example of the display screen where the remote user's video is shown at a changed position. FIG. 10 is a display screen 901 where the remote user's video is displayed as the small window 902. The display screen further has a frame 1001. The position of the small window 902 changes in response to the local user's location. When the local user is within the shoot range, the small window 902 is displayed within the frame 1001. When the local user deviates from the shoot range, the small window 902 deviates from the frame 1001. The display screen 901 can be set to function as the frame 1001. In this case, when the small window 902 deviates from the display screen 901 owing to excessive motion thereof, deviated area is not displayed or the whole image of the small window is not displayed, thus providing the same effect as in the case employing the frame 1001.

An embodiment of the ninth is described referring to the drawing.

Figure 11:
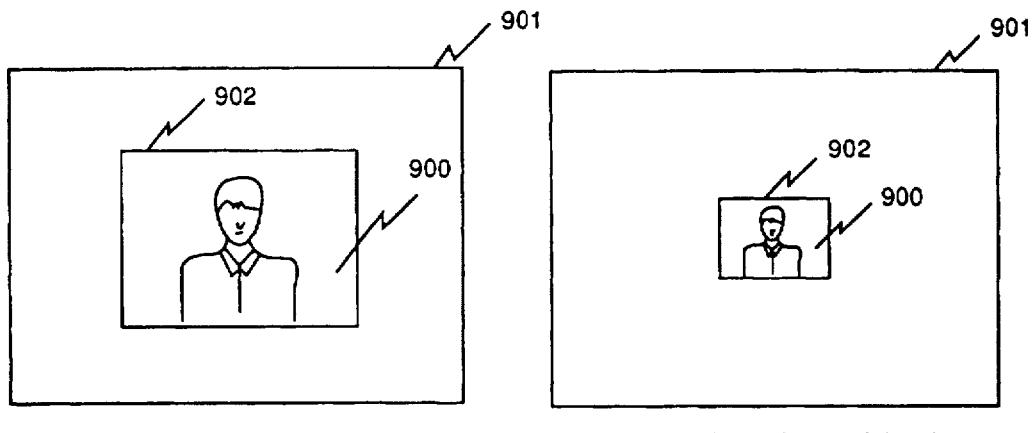
FIG. 11 shows a display screen of the user interface of the video communication terminal of the ninth embodiment.

FIG. 11 shows an example of the display screen 901 in which the size of the remote user's video is reduced when the local user deviates from the shoot range. When the local user deviates from the shoot range, the size of the remote user's video image is enlarged or reduced. Enlarging/reducing the remote user's video will be conducted by preserving the ratio of length and width of the video image size, keeping original figure of the picture or changing either length or width accompanying transformed figure. Any of the above methods provides the intended effect. Alternatively displaying the small window 902 virtually deviating from the display screen 901 is also feasible.

An embodiment of the tenth is described.

Figure 9A:
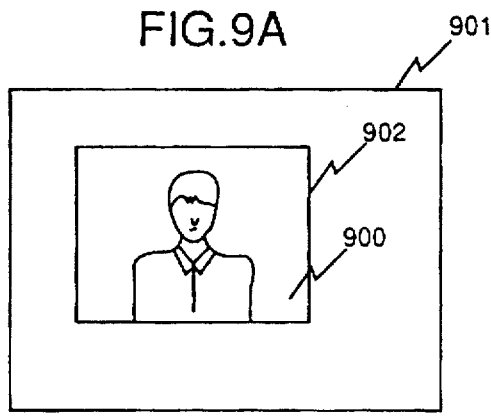
FIG. 9A to FIG. 9D show a display screen of the user interface of the video communication terminal unit of the eighth embodiment.

This embodiment notifies the local user of his/her deviation by changing characteristics on brightness of the remote user's video image shown on the display section. More specifically brightness or contrast of color of the remote user's video shown on the screen is changed. When the local user is within the shoot range, the remote user's video as shown in FIG. 9A is displayed in appropriate brightness. When the local user deviates from the shoot range, the brightness of the video image will be increased or decreased.

Alternatively the brightness of the remote user's video may be blinked at a predetermined time interval and the specific contrast of color may be excessively highlighted or made excessively flat.

An embodiment of the eleventh embodiment is described. This embodiment notifies the local user of his/her deviation from the shoot range by changing characteristics on the color hue of the remote user's video shown on the display. When the local user is within the shoot range, the remote user's video as shown in FIG. 9A is displayed to exhibit well-balanced color hue or the one defined by a predetermined numerical value. When the local user deviates from the range, the color hue of the remote user's video changes. The color hue is changed by displaying like a photo negative or changing RGB value defining the color hue so that the resultant color presents unnatural feeling to the local user. Alternatively it is changed by switching the color display into the black and white display or highlighting the specific color.

An embodiment of the twelfth embodiment is described referring to the drawing.

Figure 12:
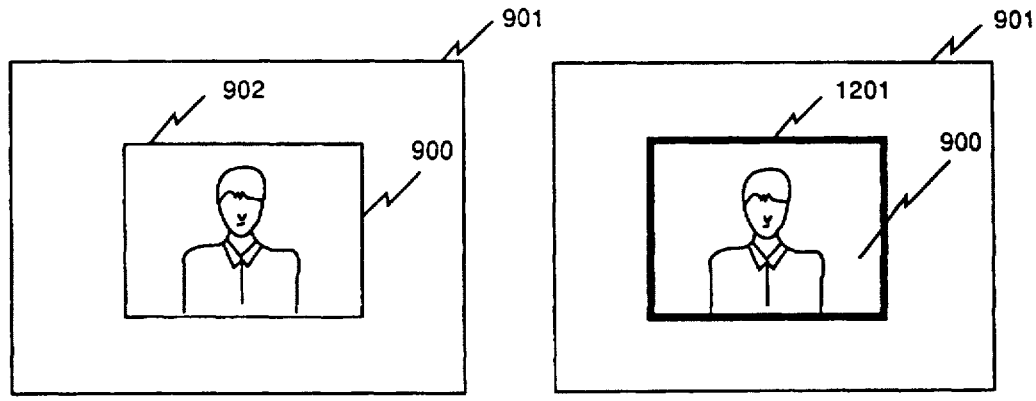
FIG. 12 shows a display screen of the user interface of the video communication terminal unit of the twelfth embodiment.

FIG. 12 shows a display screen where the frame of the window 902 of the remote user's video is changed for notifying the local user of his/her deviation. When the local user deviates from the shoot range, the frame of the window 902 is boldly highlighted. For example, the frame may be drawn boldly or by using CG so as to enclose outer contour of the remote user's video. The color of the frame may be changed as well as its color brightness for blinking. In place of the frame, adding shadow to the window for three dimensional effect is also feasible for obtaining the intended effect.

Figure 13A:
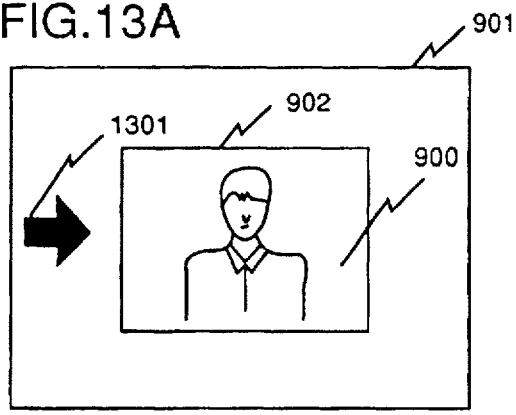
FIG. 13A to FIG. 13E show a display screen of the user interface of the video communication terminal unit of the thirteenth embodiment.
Figure 13B:
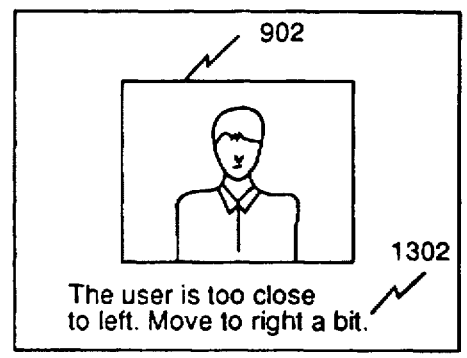
Figure 13C:
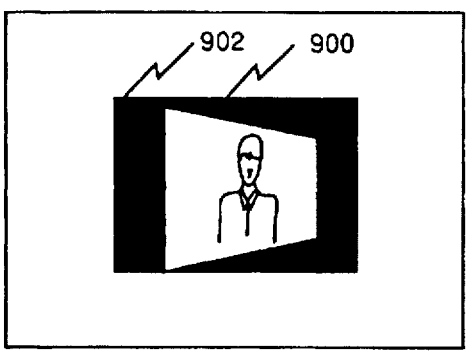
Figure 13D:
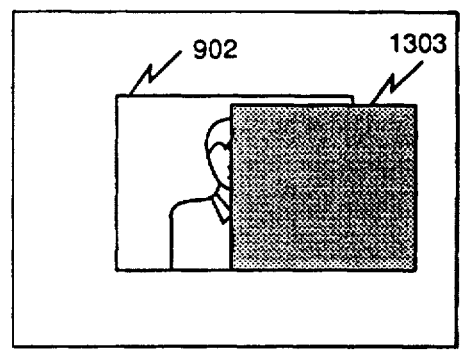
Figure 13E:
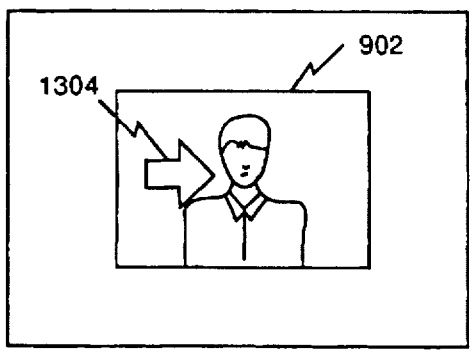

An embodiment of the thirteenth is described. This embodiment notifies the local user of his/her deviation by providing the information on deviation amount, direction or guide to resume to the shoot range. The local user is notified of the amount of the required processing of the remote user's video (amount for transformation and scrolling) in relation with the distance information how far the local user has deviated from the shoot range or which direction he/she has moved so far. In case of employing the display mode for scrolling the video image shown in FIG. 9B, the scrolling amount corresponds to the deviation amount or direction. In case of employing the display mode for changing the display starting point shown in FIG. 9C, the display starting point corresponds to the deviation amount or direction. That is, as the deviation amount increase, it is so designed to increase the scrolling amount or reducing display area by shifting the display starting point. In case of employing the display mode for shifting the window of the remote user's video from the display screen shown in FIG. 10, shifting amount or direction may correspond to the deviation amount and direction. A code 1301 such as an arrow (FIG. 13A), a message 1302 (FIG. 13B) indicating the deviation and transformation of the remote user's video 900 (FIG. 13C) may correspond to the deviation amount or direction. As FIG. 13D shows, the display section 1303 for covering the remote user's video on the screen may be moved and scrolled in relation with the deviation amount or direction. As FIG. 13E shows, a code 1304 such as an arrow is synthesized with the remote user's video to show the deviation amount or direction. In case of display modes using arrows such as FIGS. 13A and 13E, the deviation amount can be represented by length, color or color brightness of the arrow. In case of display mode using characters and numerals such as FIG. 13B, the deviation amount is represented by specific numerical values and characters. The extent of the deviation can also be represented by displaying a descriptive message using adjectives and adverbs. In case of the display mode shown in FIG. 13C, the deviation amount is represented by the area ratio or extent how much the video image has been transformed. In case of the display mode shown in FIG. 13D, the deviation amount is represented by the covered area of the remote user's video image. The deviation direction of the display mode shown in FIG. 13C is represented by the angle or shape of the transformed image. In case of the display mode shown in FIG. 13D, the deviation direction is represented by the position of the covered part of the remote user's video image or scrolling/shifting direction.

The information showing the guide to resume to the shoot range is described. When the local user deviates from the shoot range, the information showing the guide for resuming is also displayed. More specifically the information tells the local user to move by certain amount in a certain direction. In FIG. 13B, the message on the display shows which direction the local user should move to. In FIG. 13A, the arrow indicates either the deviation direction or the direction in which the local user should move for resuming. Accordingly it is necessary to define the arrow to indicate one of the above directions. FIG. 13C showing pseudo three dimensional image allows the local user to perceive as to which direction he/she should move intuitively so as to face the remote user's video image in front way. In the FIG. 13C, the local user may face the remote user's video image by moving rightward. In FIG. 13D, the local user is expected to move to reduce the covered area of the remote user's video image. In display modes shown in FIGS. 9B, 9C and FIG. 10, the intended effect can be obtained by showing scrolling amount or display starting position as the information guiding to resume the shoot range.

Figure 9B:
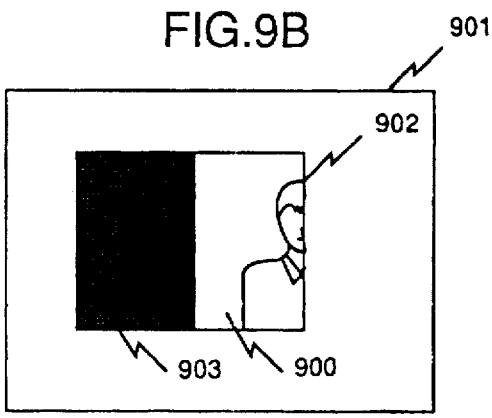
Figure 9C:
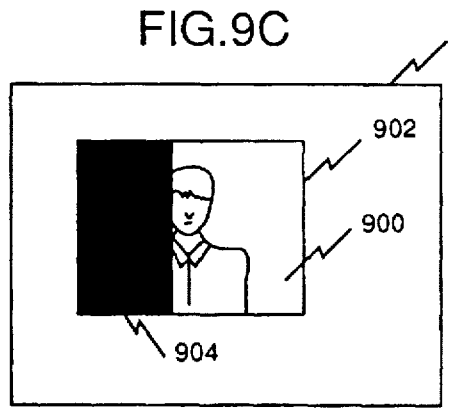
Figure 9D:
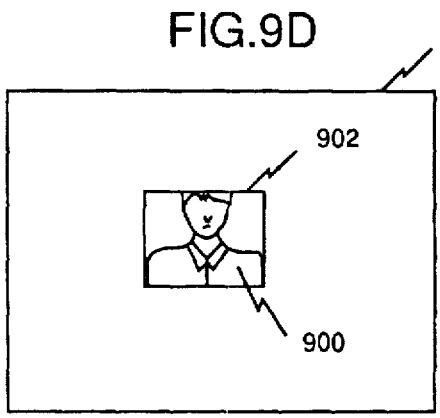

The local user deviates forward or backward to the shoot range as well as in vertical or horizontal direction to the camera. As a result, the image of the local user may deviate from the camera frame or get out of focus. The size of the local user's video image may be decreased if he/she stands too far from the camera. In such a case, the forward or backward deviation can be represented by using the display modes as shown in FIGS. 9D, 11 and 12. If the local user deviates from the optimum shooting location, the display mode of FIG. 9D shows the remote user's video with some missing part. Similarly the display mode shown in FIG. 11 shows enlarged/reduced size of the remote user's video. In case of the display mode shown in FIG. 12, frame of the small window is boldly highlighted. Displays shown in FIGS. 9D and 11 may be correlated with distance, which allows the user to perceive his/her forward or backward deviation intuitively. Displaying with codes such as an arrow or characters also provides the same effect as described above.

Figure 14:
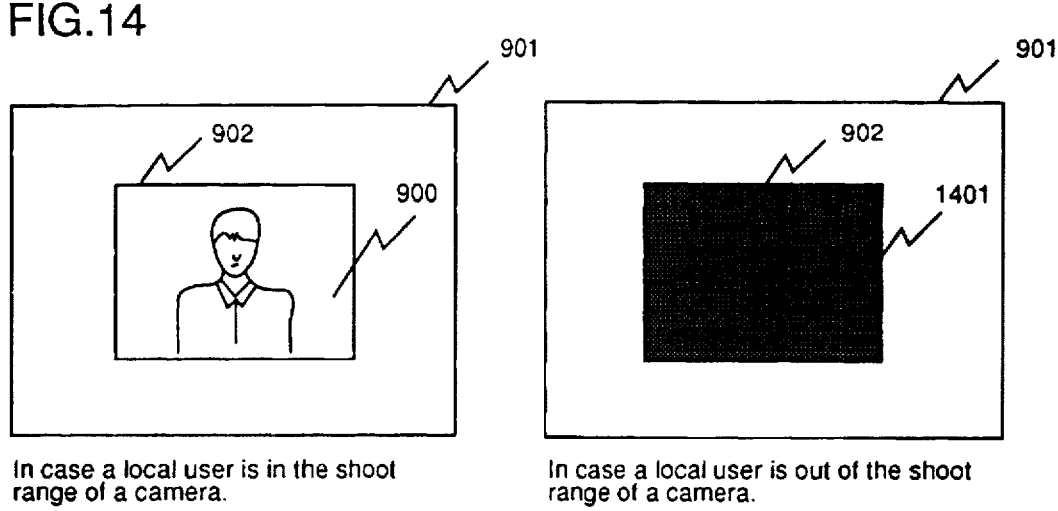
FIG. 14 shows a display screen of the user interface of the video communication terminal unit of the fourteenth embodiment.
Figure 15A:
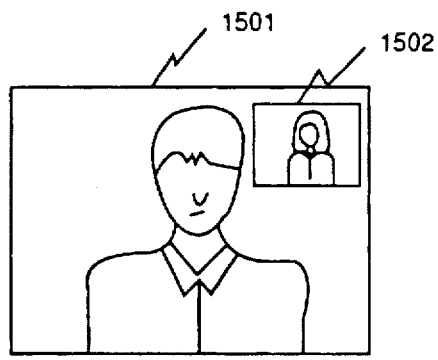
FIG. 15A to FIG. 15C show a display screen of the prior art video communication terminal unit.
Figure 15B:
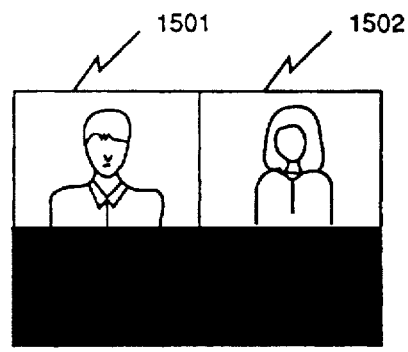
Figure 15C:
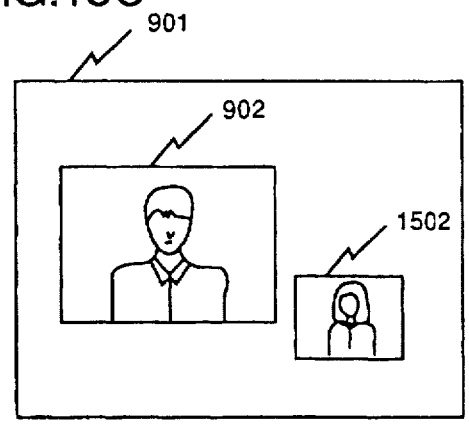
Figure 16:
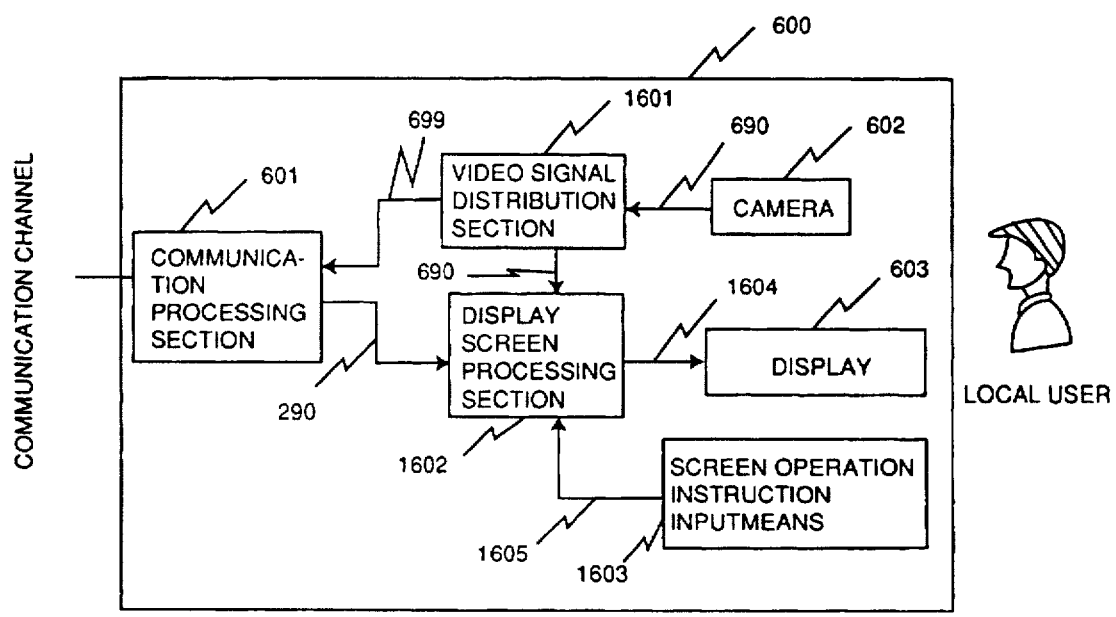
FIG. 16 is a block diagram representing a construction of the prior art video communication terminal unit for displaying the video image of the local user thereof.

An embodiment of the fourteenth is described. In this embodiment, the remote user's video is not displayed on the screen when the local user deviates from the shoot range. For example, as shown in FIG. 14, when the local user deviates from the shoot range, the small window 902 does not show the remote user's video or shows images other than the remote user's video. Alternatively the different image is overlaid with the remote user's video in the small window or the small window is erased for making the screen into the non-display condition. In FIG. 14, the deviation of the local user is indicated by showing non-display image 1401 on the display screen. The non-display image 1401 as black screen resulted from absence of the signal may be in any form so far as it allows the local user to perceive the non-display condition.

The advantage derived from the non-display condition showing the local user's deviation is described. Generally the people has a normal conversation with the other by facing and eye contacting with each other. Such face-to-face conversation seems to have been natural to most of the people. With the conventional video communication terminal unit, a local user cannot see the video image of the remote user, or vice versa. This condition is equivalent to the case caused by the local user who has changed the shooting direction so that he/she is not taken by the camera. Even when the local user deviates from the shoot range, the conventional terminal unit shows the remote user's video image on the display. The conventional system allowing only one user to see the other's video image has created unnatural communication environment for both users compared with spontaneous face-to-face conversation. For the user who has been seen by the other user may have negative impression of being always monitored. Such unbalanced conversation environment prevents both users from judging how they have been seen on the display during communication. As a result, it has been required for the local user to monitor the video image sent to the other party by displaying the video image filmed by the camera at his/her site. The above problem can be overcome by setting to allow each user to see the image of the other on the display screen. That is, when one user deviates from the shoot range, the other user cannot see the image of the counterpart. The communication via the display screen is realized only when both users are within the shoot range of the camera. This condition forms the environment where both users virtually face with each other and direct them to be in the shoot range spontaneously. Since the display shown on the screen interacts with the movement of the user, he/she begins to take attention to a series of change in the video image shown on the screen, not to the camera. This contributes to keep the users from being unconscious of the camera indirectly. This allows them to concentrate on conversation by eliminating or decreasing the strain or unnatural feeling.

In the fourteenth embodiment, when one user deviates from the shoot range, both users cannot see the image of each other. The user deviating from the shoot range cannot see the other user due to non-display condition on the screen effected by the user interface of the present invention. While the other user cannot see the deviating user because of his/her deviation. The range for showing each video image corresponds to that for shooting of the camera, thus allowing the user to realize a picture of his/her video image seen by the other user intuitively. In other words, if the user locates where he/she sees no video image of the other user on the display, the video image of himself/herself is not seen by the other user. This will improve the security and further assure privacy of the individual user. With the prior art, the user has to locate close to the terminal for monitoring and confirming the video image filmed at his/her site. While the present invention allows the user to confirm the display condition of his/her video image by seeing that of the other user in spite of being remotely located from the terminal unit. When one of these user deviates from the shoot range, both terminal units are so set to make non-display condition through the user interface of the present invention, providing the similar effects. In the above case, the communication interface is required for transmitting the control command for the non-display condition from the deviating user to the other user. The control commands transmitted/received are designed to be analyzed by the local user's location discrimination section. In the present invention, when the user wants to have a normal image on the display, he/she has to locate within the shoot range of the camera, resulting in an environment where both users can face with each other naturally. This invention further eliminates the shortcoming of the conventional system which has made the user feel like being always monitored by the other user.

An embodiment of the fifteenth is described. In this embodiment, when the local user deviates from the shoot range, the remote user's video image is changed stepwise (consecutively) between the display and non-display conditions based on the deviation amount. However it may be feasible to set a predetermined number of intermediate conditions between the display and non-display conditions through which the remote user's video image changes into different condition in discrete manner. The display mode for notifying the local user of the deviation amount is applied for realizing the fifteenth invention. More specifically it is preferable to have the mode for displaying the deviation amount as shown in FIGS. 9B, 9C and 9D and to prevent the remote user's video from being shown on the display when the local user deviates from the shoot range of the camera. Similarly display modes shown in FIGS. 10, 11, 13C and 13D can change the display screen stepwise between the display and non-display conditions, leading to intended effects.

An advantageous point for changing the picture image stepwise between the display and non-display conditions is described. Although switching the display or non-display condition gives no adverse effects on the operation of the terminal unit, the user tends to be misled that the switching may cause disconnection, damage or malfunction of the terminal unit owing to the abruptness. Changing the display stepwise between the display and non-display conditions shows the user that the terminal unit is operating to change the display of the other user's video image, thus eliminating misconception of the user about the function of the system.

During face-to-face conversation through the video communication, the possibility that one party appears or disappears instantaneously may rarely occur. Such occasion, if any, only makes the user surprise or uneasy. It is not preferable to have the video image displayed or non-displayed instantaneously during conversation in view of natural communication environment provided by the terminal interface. Therefore it is advantageous to change the remote user's video image stepwise between the display and non-display conditions.

It is also unlikely that the behavior of the local user is represented by two extreme situations, deviating from and resuming to the shoot range instantaneously. It is frequently observed that some part of the user's body deviates from the shoot range and the other part is within the shoot range. Therefore the deviation is caused by the stepwise and consecutive behavior of the user. Showing stepwise and consecutive change in the remote user's video representing the lapse of time and the deviation amount or direction provides more correct and detail information for notifying the user of deviation from the shoot range. For example, in case of displaying the deviation condition in real time as the movement of the small window of the remote user's video, the local user understands the direction of his/her movement (entering into the shoot range to face the other user, or deviating from the shoot range not to be seen by the other user) through feedback of his/her own movement. The local user tends to have a feeling that the terminal unit interacts with his/her motion, allowing them to concentrate on communication, keep and further improve the interest in the conversation effectively.

The received video processing section 201 for realizing the aforementioned embodiment is described in detail.

Figure 17:
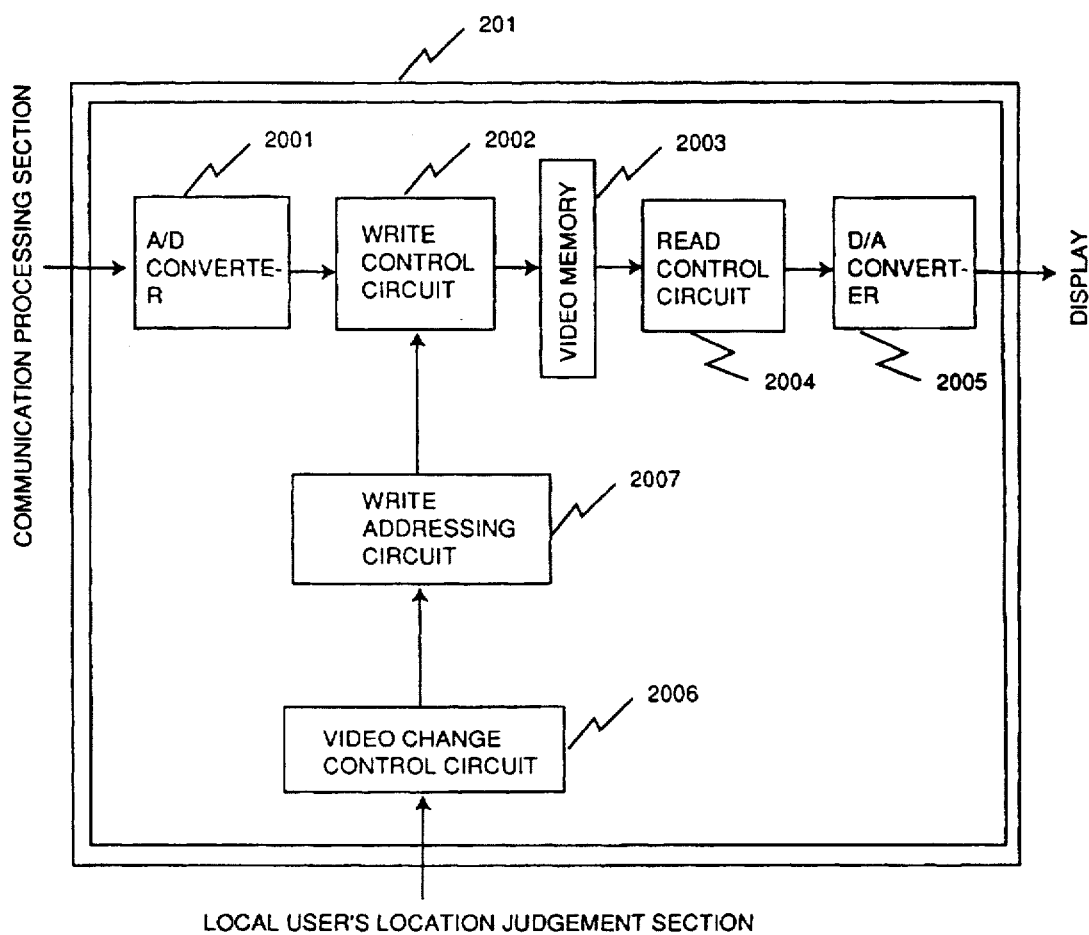
FIG. 17 is a block diagram of a received video processing section 201 in case of scroll displaying or deforming a remote user's video image.

FIG. 17 is a block diagram of the received video processing section 201 in case of scroll displaying or deforming the remote user's video image as shown in FIGS. 9B, 9C and 9D.

In FIG. 17, a reference numeral 2001 is an A/D converter which converts the video data sent from the remote user into digital data. A reference numeral 2002 is a write control circuit which controls writing of the video data into a video memory 2003 based on the information transmitted from a write addressing circuit 2007 (described later). The video data are written at a predetermined address in the video memory 2003 under the control of the write control circuit 2002. A reference numeral 2004 is a read control circuit which controls reading of the video data stored in the video memory 2003. A reference numeral 2005 is a D/A converter which converts the digital data into analogue data, which are displayed on a display 603. A reference numeral 2006 is a video change control circuit which sets a direction or an amount of scrolling the remote user's video image responding to a signal sent from a user's location discrimination section 102 in case of scroll displaying. In case of deforming the remote user's video image, the video change control circuit 2006 sets the amount, direction and configuration of wipe applied to the remote user's video image responding to the signal from the user's location discrimination section 102. A reference numeral 2007 is a write addressing circuit which determines the location at which the remote user's video image is written in the video memory 2003 based on the control signal of the video change control circuit 2006.

Figure 18:
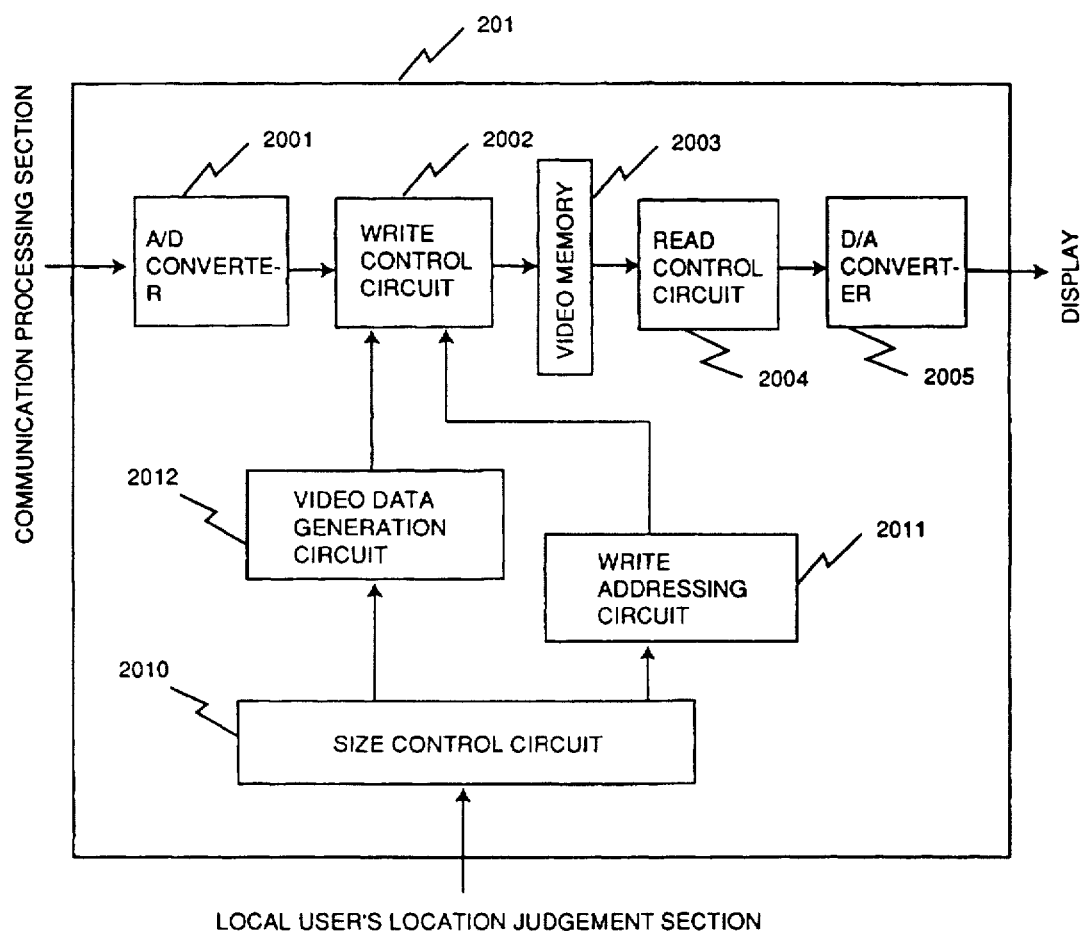
FIG. 18 is a block diagram of a received video processing section 201 in case of displaying the remote user's video image of a reduced size.

FIG. 18 is a block diagram of the received video processing section 201 in case of displaying the remote user's video image of a reduced size as shown in FIG. 11. The elements with the same reference numerals as those shown in FIG. 17 have identical functions, thus omitting explanations.

A reference numeral 2010 is a size control circuit which sets the size and the location of displaying the remote user's video image based on the signal sent from the user's location discrimination section 102. A reference numeral 2011 is a write addressing circuit which determines the location at which the remote user's video image is written in the video memory 2003. A reference numeral 2012 is a picture element data generation circuit which generates picture element data for displaying the remote user's video image of a reduced size based on the control signal of the size control circuit 2010. The write control circuit 2002 writes the generated picture element data into the video memory 2003 based on the determination result of the write addressing circuit 2011.

Figure 19:
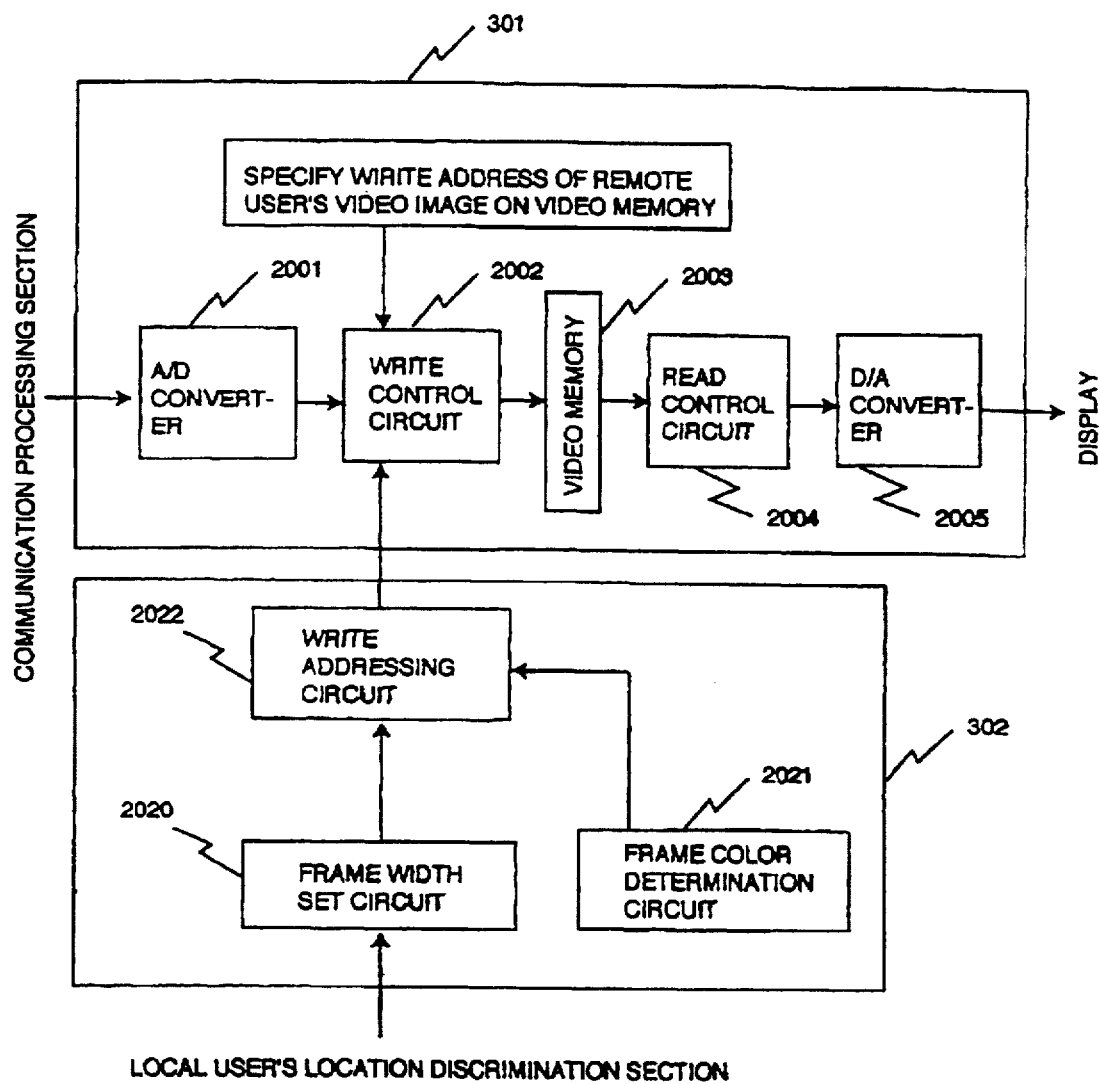
FIG. 19 is a block diagram of a received video processing section 201 in case of changing a frame of the remote user's video image.

FIG. 19 is a block diagram of the received video processing section 201 in case of changing the frame of the remote user's video image as shown in FIG. 12. In this case, the received video processing section 201 shown in FIG. 17 works in cooperation with a notification video generation section 302 for changing the frame.

A reference numeral 2020 is a frame width set circuit which broaden the frame width upon receiving the signal from the user's location discrimination section 102 indicating the local user's deviation from the shoot range. A reference numeral 2021 is a frame color set circuit in the notification video generation section 302 which sets the frame color. A reference numeral 2022 is a write addressing circuit for determining the location of the frame data having width and color specified by the frame width set circuit 2020 and the frame color set circuit 2021, respectively in the video memory 2003. Based on the determination result of the write addressing circuit 2022, the write control circuit 2002 writes the generated frame data into the video memory 2003.

Figure 20:
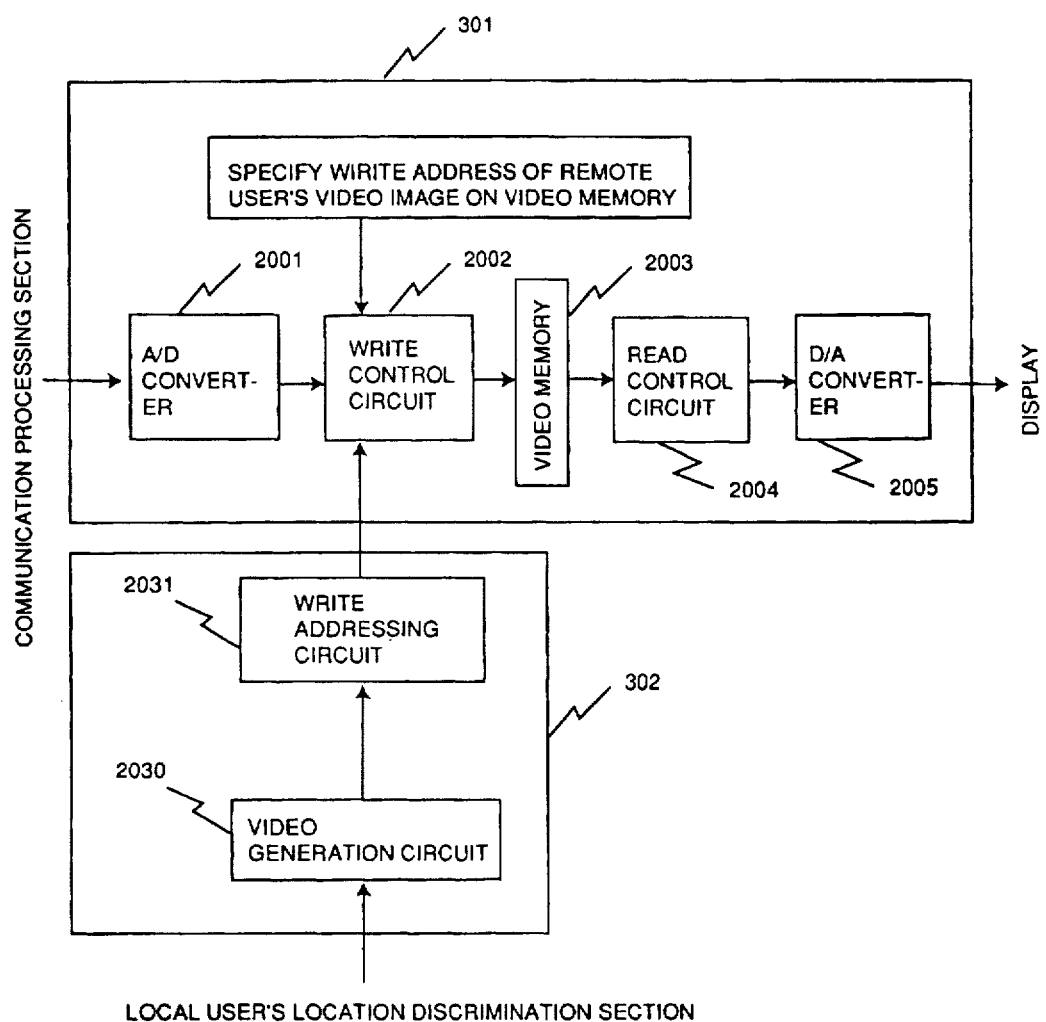
FIG. 20 is a block diagram of a received video processing section 201 in case of inserting data such as an arrow mark or characters to or overlaying the remote user's video image.

FIG. 20 is a block diagram in case of inserting data such as an arrow mark or characters to the remote user's video image or overlaying thereon as shown in FIGS. 13A and 13B. In this case, the received video processing section 201 shown in FIG. 17 works in cooperation with the notification video generation section 302.

A reference numeral 2030 is a video generation circuit for generating an arrow mark or characters which will be displayed. A reference numeral 2040 is a write addressing circuit which determines the location at which the arrow mark or characters generated in the video generation circuit 2030 are written in the video memory 2003. Based on the determination result of the write addressing circuit 2022, the write control circuit 2002 writes the generated data such as characters into the video memory 2003.

Figure 21:
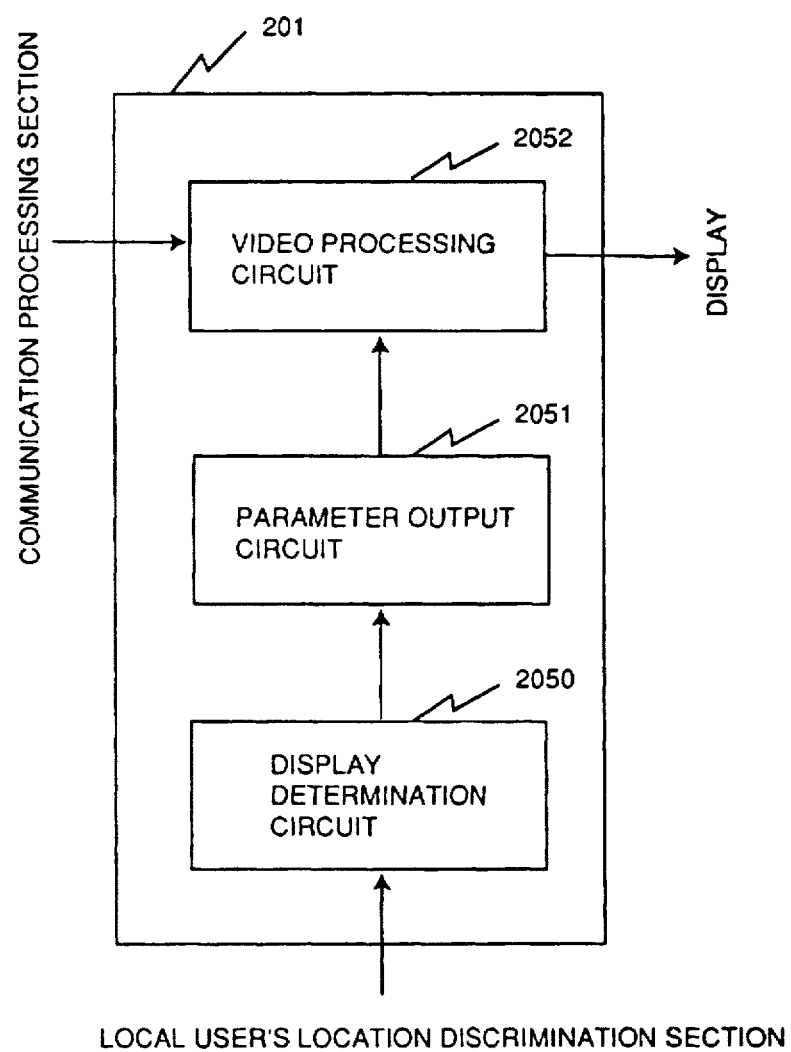
FIG. 21 is a block diagram of a received video processing section 201 in case of putting the remote user's video image into a non-display condition when a local user deviates from a shoot range.

FIG. 21 is a block diagram of the received video processing section 201 in case of putting the remote user's video image into a non-display condition when the local user deviates from the shoot range.

In FIG. 21, a reference numeral 2050 is a display set circuit for determining whether or not the remote user's video image is displayed responding to the signal from the user's location discrimination section 102. The display set circuit 2050 does not have to be constructed to select between the display and non-display conditions. The display set circuit 2050 is so constructed to set a plurality of stages between the display and non-display conditions. For example, the remote user's video image can be partially put into non-display condition. A reference numeral 2051 is a parameter output circuit which outputs a parameter indicating as to which stage the remote user's video image should be put into the non-display condition based on the determination result of the display set circuit 2050. A reference numeral 2052 is a video processing circuit for processing the input remote user's video image, which is put into the specified non-display condition based on the parameter output from the parameter output circuit 2051.

In addition, video images can be controlled by the read control circuit, although video images are controlled by the write control circuit in the above explanations.

Furthermore, needless to say, it shows effective communication performance to simply put the present invention into practice at a local point. However, if putting the present invention into practice not only at a local point but also at a remote point, the better qualitative communication performance can be realized.

The present invention allows the local user to confirm whether he/she is within the shoot range of the camera without requiring the display of his/her own video image. The present invention eliminates or reduce the necessity to change the shoot range or any other required controlling operation which may disturb natural conversation among users.

The present invention provides the environment where the local user can communicate with the remote user through the video image thereof naturally. As a result, both users have conversation by receiving non verbal information derived from facial expression with each other, further promoting conversation and communication. When one user cannot see the other user's video image, the video of the user is not also seen by the other user, which realizes the environment allowing for easy understanding of the communication status. The local user can intend to move to the position where his/her video image is not seen by the other user, improving security and protecting privacy. The local user does not have to be conscious of being filmed by the camera, promoting spontaneous conversation.

Combining the above described effects realizes the terminal user interface for providing the environment where users can have conversation naturally and comfortably like the face-to-face communication.

What is claimed is:

1. A user interface of a video communication terminal unit having a shoot means for shooting a terminal user, a display means for displaying a video image and a video communication processing means for executing video communication between said terminal user and a remote terminal user, said user interface comprising:

a location detection means for detecting a location of said terminal user shot by said shoot means and generating information on said terminal user's location;

a location judgement means for determining whether or not said terminal user is within an appropriate shoot range of said shoot means and generating notification control information based on the determination result; and a notification means for notifying said terminal user of his/her deviation from said shoot range if said notification control information indicates said terminal user's deviation.

2. The user interface of a video communication terminal unit of claim 1, wherein said notification means processes a video image transmitted from a remote terminal user based on said notification control information so as to notify said terminal user whether or not he/she has deviated from said shoot range; the resultant video image processed by said notification means is output to said display means.

3. The user interface of a video communication terminal unit of claim 2, wherein said notification means displays a video image transmitted from said remote terminal user in a different display area on said display means compared with the area where a video image is displayed in case said terminal user is within the appropriate shoot range.

4. The user interface of a video communication terminal unit of claim 2, wherein if said terminal user deviates from said shoot range, said notification means displays a video image transmitted from the remote terminal user in the different display location on said display means compared with the location where a video image is displayed in case said terminal user is within the appropriate shoot range.

5. The user interface of a video communication terminal unit of claim 2, wherein if said terminal user deviates from said shoot range, said notification means displays a video image transmitted from said remote terminal user in the different size compared with that of the video image displayed in case said terminal user is within said shoot range.

6. The user interface of a video communication terminal unit of claim 2, wherein if said terminal user deviates from said shoot range, said notification means displays a video image transmitted from said remote terminal user on said display means by changing its brightness characteristics to be different from those of the video image displayed in case said terminal user is within said shoot range.

7. The user interface of a video communication terminal unit of claim 2, wherein if said terminal user deviates from said shoot range, said notification means displays a video image transmitted from said remote terminal user by changing its color hue characteristics to be different from those of the video image displayed in case said terminal user is within said shoot range.

8. The user interface of a video communication terminal unit of claim 1, wherein said notification means comprises a notification video generation means for generating a notification video image representing said terminal user's deviation from said shoot range and a selection means for switching a display into said notification video image from a video image transmitted from said remote terminal user based on said notification control information, which is output to said display means.

9. The user interface of a video communication terminal unit of claim 8, wherein said notification means comprises a synthesizing means, in place of said selection means, for synthesizing a video image transmitted from said remote terminal user with said notification video image, which is output to said display means.

10. The user interface of a video communication terminal unit of claim 9, wherein if said terminal user deviates from said shoot range, said notification video generation means generates a different window frame compared with that displayed in case said terminal user is within said shoot range; said synthesizing means synthesizes said generated window frame with a video image transmitted from said remote terminal user.

11. The user interface of a video communication terminal unit of claim 1, wherein said notification means comprises a notification information generation means for generating notification information indicating said terminal user's deviation from said shoot range based on said notification control information and an information means for informing said terminal user's deviation from said shoot range based on said notification information.

12. The user interface of a video communication terminal unit of claim 11, wherein said notification information is in the form of an audio signal and said information means is a speaker.

13. The user interface of a video communication terminal unit of claim 1, wherein said notification means comprises a video processing means for processing a video image transmitted from said remote terminal user so as to notify said terminal user whether or not he/she has deviated from said shoot range, a notification video generation means for generating a notification video image indicating said terminal user's deviation from said shoot range and a selection means for switching a display into said notification means from the video image which has been processed by said video processing means based on said notification control information, which is output to said display means.

14. The user interface of a video communication terminal unit of claim 13, wherein said notification means comprises a synthesizing means, in place of said selection means, for synthesizing a video image transmitted from said remote terminal user with said notification video image, which is output to said display means.

15. The user interface of a video communication terminal unit of claim 13, wherein said notification means further comprises a notification information generation means for generating notification information indicating said terminal user's deviation from said shoot range based on said notification control information and an information means for informing said terminal user's deviation from said shoot range based on said notification information.

16. The user interface of a video communication terminal unit of claim 1, wherein based on said notification control information indicating said terminal user's deviation from said shoot range, said notification means displays data describing how far said terminal user has deviated from said shoot range on said display means.

17. The user interface of a video communication terminal unit of claim 1, wherein based on said notification control information indicates said terminal user's deviation from said shoot range, said notification means displays data describing which direction said terminal user has deviated on said display means.

18. The user interface of a video communication terminal unit of claim 1, wherein based on said notification control information indicates said terminal user's deviation from said shoot range, said notification means displays information describing for said terminal user how to resume the original location within said shoot range.

19. The user interface of a video communication terminal unit of claim 1, wherein based on said notification control information indicating said terminal user's deviation from said shoot range, said notification means does not display a video image transmitted from said remote terminal user on said display means.

20. The user interface of a video communication terminal unit of claim 1, wherein based on said notification control information indicating said terminal user's deviation from said shoot range, said notification means puts a video image transmitted from said remote terminal user into a non-display condition on said display means step by step in accordance with said data describing how far said terminal user has deviated from said shoot range.

21. A method for notifying said terminal user's deviation from an appropriate shoot range in a video communication system between a terminal user and a remote terminal user through transmitting/receiving a video image of each other, said method comprising:
 a step for generating location information of said terminal user by detecting a location of said terminal user shot by a shoot means,
 a step for determining whether or not said terminal user is within said shoot range based on said location information and generating notification control information based on said determination result; and
 a notification step for notifying said terminal user of his/her deviation from said appropriate shoot range based on said notification control information indicating said terminal user's deviation from said shoot range.

22. The method for notifying a terminal user's deviation from an appropriate shoot range of claim 21, wherein said notification step processes a video image transmitted from said remote terminal user so as to notify said terminal user whether or not he/she has deviated from said shoot range based on said notification control information and displaying said processed video image.

23. The method for notifying a terminal user's deviation from an appropriate shoot range of claim 22, wherein if said terminal user deviates from said appropriate shoot range, said notification step displays a video image transmitted from said remote terminal user in a different display area compared with the area where the video image is displayed in case said terminal user is within said appropriate shoot range.

24. The method for notifying a terminal user's deviation from an appropriate shoot range of claim 22, wherein if said terminal user deviates from said appropriate shoot range, said notification step displays a video image transmitted from said remote terminal user in a different location compared with the location where the video image is displayed in case said terminal user is within said appropriate shoot range.

25. The method for notifying a terminal user's deviation from an appropriate shoot range of claim 22, wherein if said terminal user deviates from said appropriate shoot range, said notification step displays a video image transmitted from said remote terminal user in a different size compared with that in case said terminal user is within said appropriate shoot range.

26. The method for notifying a terminal user's deviation from an appropriate shoot range of claim 22, wherein if said terminal user deviates from said appropriate shoot range, said notification step displays a video image transmitted from said remote terminal user by changing its brightness characteristics to be different from those of the video image displayed in case said terminal user is within said appropriate shoot range.

27. The method for notifying a terminal user's deviation from an appropriate shoot range of claim 22, wherein if said terminal user deviates from said appropriate shoot range, said notification step displays a video image transmitted from said remote terminal user by changing its color hue characteristics to be different from those of the video image displayed in case said terminal user is within said appropriate shoot range.

28. The method for notifying a terminal user's deviation from an appropriate shoot range of claim 21, wherein said notification step comprises a notification video generation step for generating a notification video image indicating said terminal user's deviation from said appropriate shoot range and a selection step for switching a display into said notification video generated by said notification video generation step from a video image transmitted from said remote terminal user based on said notification control information.

29. The method for notifying a terminal user's deviation from an appropriate shoot range of claim 28, wherein said notification step comprises a synthesizing step, in place of said selection step, for synthesizing a video image transmitted from said remote terminal user with said notification video image.

30. The method for notifying a terminal user's deviation from an appropriate shoot range of claim 29, wherein said notification video generation step generates a different window frame compared with that displayed in case said terminal user is within said appropriate shoot range; said synthesizing step synthesizes said generated window frame with a video image transmitted from said remote terminal user.

31. The method for notifying a terminal user's deviation from an appropriate shoot range of claim 21, wherein said notification step comprises a notification information generation step for generating notification information indicating said terminal user's deviation from said appropriate shoot range based on said notification control information and an information step for informing said terminal user's deviation from said appropriate shoot range based on said notification information.

32. The method for notifying a terminal user's deviation of claim 31, wherein said notification information is in the form of an audio sound for informing said terminal user's deviation.

33. The method for notifying a terminal user's deviation of claim 21, wherein said notification step comprises a video processing step for processing a video image transmitted from said remote terminal user so as to notify said terminal user whether or not he/she has deviated from said appropriate shoot range based on said notification control information, a notification video generation step for generating a notification video image indicating said terminal user's deviation from said appropriate shoot range and a selection step for selecting for switching a display into said notification video image from the video image which has been processed in said video processing step based on said notification control information.

34. The method for notifying a terminal user's deviation from an appropriate shoot range of claim 33, wherein said notification step comprises a video synthesizing step, in place of said selection step, for synthesizing a video image transmitted from said remote terminal user with said notification video image.

35. The method for notifying a terminal user's deviation from an appropriate shoot range of claim 33, wherein said notification further comprises a notification information generation step for generating notification information indicating said terminal user's deviation from said appropriate shoot range and an information step for informing said terminal user's deviation from said appropriate shoot range based on said notification information.

36. The method for notifying a terminal user's deviation from an appropriate shoot range of claim 21, wherein based on said notification control information indicating said terminal user's deviation from said appropriate shoot range, said notification step displays data describing how far said terminal user has deviated from said shoot range.

37. The method for notifying a terminal user's deviation from an appropriate shoot range of claim 21, wherein based on said notification control information indicating said terminal user's deviation from said appropriate shoot range, said notification step displays data describing which direction said terminal user has deviated.

38. The method for notifying a terminal user's deviation from an appropriate shoot range of claim 21, wherein based on said notification control information indicating said terminal user's deviation from said appropriate shoot range, said notification step displays data informing said terminal user of how to resume an original location within said appropriate shoot range.

39. The method for notifying a terminal user's deviation from an appropriate shoot range of claim 21, wherein based on said notification control information indicating said terminal user's deviation from said appropriate shoot range, said notification step does not display any video image transmitted from said remote terminal user.

40. The method for notifying a terminal user's deviation from an appropriate shoot range of claim 21, wherein based on said notification control information indicates said terminal user's deviation from said appropriate shoot range, said notification step puts a video image transmitted from said remote terminal user into a non-display condition step by step in accordance with said data describing how far said terminal user has deviated from said shoot range.

* * * * *